(12) United States Patent
Cote et al.

(10) Patent No.: US 8,879,881 B2
(45) Date of Patent: Nov. 4, 2014

(54) ROTATABLE ROUTING GUIDE AND ASSEMBLY

(75) Inventors: Monique L. Cote, Fort Worth, TX (US); Gerald J. Davis, Haslet, TX (US); Brent M. Frazier, Haslet, TX (US); William J. Giraud, Azle, TX (US); Raymond G. Jay, Mansfield, TX (US); Brian D. Kingsbury, Watauga, TX (US)

(73) Assignee: Corning Cable Systems LLC, Hickory, NC (US)

( * ) Notice: Subject to any disclaimer, the term of this patent is extended or adjusted under 35 U.S.C. 154(b) by 511 days.

(21) Appl. No.: 12/953,536

(22) Filed: Nov. 24, 2010

(65) Prior Publication Data

US 2011/0268413 A1 Nov. 3, 2011

Related U.S. Application Data

(60) Provisional application No. 61/329,898, filed on Apr. 30, 2010.

(51) Int. Cl.
*G02B 6/00* (2006.01)
*G02B 6/44* (2006.01)

(52) U.S. Cl.
CPC ............ *G02B 6/4471* (2013.01); *G02B 6/4452* (2013.01)
USPC ............. 385/135; 211/134; 211/163; 174/50; 312/223.6

(58) Field of Classification Search
USPC .............. 385/135; 211/13.1, 895.5, 134, 163; 248/74.2; 174/50; 312/223.6
See application file for complete search history.

(56) References Cited

U.S. PATENT DOCUMENTS 620,013 A 2/1899 Barnes
2,528,910 A 11/1950 Poe
(Continued)

FOREIGN PATENT DOCUMENTS

AU 2010270959 A1 2/2012
CA 2029592 A1 5/1992
(Continued)

OTHER PUBLICATIONS

Final Office Action for U.S. Appl. 12/946,139 mailed Feb. 15, 2013, 17 pages.
(Continued)

*Primary Examiner* — Peter Radkowski
(74) *Attorney, Agent, or Firm* — John H. Vynalek

(57) ABSTRACT

A rotatable routing guide assembly for fiber optic cables routed in a fiber optic equipment shelf is disclosed. The assembly comprises a guide portion, an attachment feature and a keyed receiver. The guide portion has a bottom, a top, a deformable first wall, a deformable second wall and a third wall forming a plurality of segments, and is configured to receive fiber optic cables of different sizes by different ones of the plurality of segments. The attachment feature removably attaches the guide portion to the shelf. The attachment feature has a first tab forming a first notch with the guide portion, and a second tab forming a second notch with the guide portion. The keyed receiver is located in the shelf and has a lip extending partially around an interior edge. The lip is received in at least one of the first notch and the second notch and friction fit between at least one of the first tab and the second tab and the guide portion.

27 Claims, 11 Drawing Sheets

(56) References Cited

U.S. PATENT DOCUMENTS

| | | | |
|---|---|---|---|
| 2,614,685 A * | 10/1952 | Miller | 198/731 |
| 3,081,717 A | 3/1963 | Yurevich | |
| 3,175,873 A | 3/1965 | Blomquist et al. | |
| 3,212,192 A | 10/1965 | Bachmann et al. | |
| 3,433,886 A | 3/1969 | Myers | |
| 3,494,306 A | 2/1970 | Aguilar | |
| 3,545,712 A | 12/1970 | Ellis | |
| 3,568,263 A * | 3/1971 | Meehan | 269/91 |
| 3,646,244 A | 2/1972 | Cole | |
| 3,701,835 A | 10/1972 | Eisele et al. | |
| 3,880,396 A * | 4/1975 | Freiberger et al. | 248/475.1 |
| 3,906,592 A | 9/1975 | Sakasegawa et al. | |
| 3,991,960 A * | 11/1976 | Tanaka | 248/68.1 |
| 4,047,797 A | 9/1977 | Arnold et al. | |
| 4,059,872 A | 11/1977 | Delesandri | |
| 4,119,285 A * | 10/1978 | Bisping et al. | 248/72 |
| 4,148,454 A | 4/1979 | Carlson et al. | |
| 4,239,316 A | 12/1980 | Spaulding | |
| 4,244,638 A | 1/1981 | Little et al. | |
| 4,285,486 A | 8/1981 | Von Osten et al. | |
| 4,303,296 A | 12/1981 | Spaulding | |
| 4,354,731 A | 10/1982 | Mouissie | |
| 4,457,482 A * | 7/1984 | Kitagawa | 248/74.3 |
| 4,525,012 A | 6/1985 | Dunner | |
| 4,540,222 A | 9/1985 | Burrell | |
| 4,561,615 A | 12/1985 | Medlin, Jr. | |
| 4,564,163 A * | 1/1986 | Barnett | 248/71 |
| 4,597,173 A | 7/1986 | Chino et al. | |
| 4,611,875 A | 9/1986 | Clarke et al. | |
| 4,635,886 A * | 1/1987 | Santucci et al. | 248/73 |
| 4,645,292 A | 2/1987 | Sammueller | |
| 4,657,340 A | 4/1987 | Tanaka et al. | |
| 4,681,288 A * | 7/1987 | Nakamura | 248/71 |
| 4,702,551 A | 10/1987 | Coulombe | |
| 4,711,518 A | 12/1987 | Shank et al. | |
| 4,736,100 A | 4/1988 | Vastagh | |
| 4,744,629 A | 5/1988 | Bertoglio et al. | |
| 4,747,020 A | 5/1988 | Brickley et al. | |
| 4,752,110 A | 6/1988 | Blanchet et al. | |
| 4,753,510 A | 6/1988 | Sezerman | |
| 4,787,706 A | 11/1988 | Cannon, Jr. et al. | |
| 4,792,203 A | 12/1988 | Nelson et al. | |
| 4,798,432 A | 1/1989 | Becker et al. | |
| 4,805,979 A | 2/1989 | Bossard et al. | |
| 4,808,774 A | 2/1989 | Crane | |
| 4,824,193 A | 4/1989 | Maeda et al. | |
| 4,824,196 A | 4/1989 | Bylander | |
| 4,826,277 A | 5/1989 | Weber et al. | |
| 4,838,643 A | 6/1989 | Hodges et al. | |
| 4,840,449 A | 6/1989 | Ghandeharizadeh | |
| 4,865,280 A | 9/1989 | Wollar | |
| 4,898,448 A | 2/1990 | Cooper | |
| 4,900,123 A | 2/1990 | Barlow et al. | |
| 4,911,662 A | 3/1990 | Debortoli et al. | |
| 4,948,220 A | 8/1990 | Violo et al. | |
| 4,949,376 A | 8/1990 | Nieves et al. | |
| 4,971,421 A | 11/1990 | Ori | |
| 4,986,625 A | 1/1991 | Yamada et al. | |
| 4,988,831 A | 1/1991 | Wilson et al. | |
| 4,991,928 A | 2/1991 | Zimmer | |
| 4,995,688 A | 2/1991 | Anton et al. | |
| 5,001,602 A | 3/1991 | Suffi et al. | |
| 5,005,941 A | 4/1991 | Barlow et al. | |
| 5,017,211 A | 5/1991 | Wenger et al. | |
| 5,023,646 A | 6/1991 | Ishida et al. | |
| 5,024,498 A | 6/1991 | Becker et al. | |
| 5,028,114 A | 7/1991 | Krausse et al. | |
| 5,037,175 A | 8/1991 | Weber | |
| 5,048,918 A | 9/1991 | Daems et al. | |
| 5,060,897 A | 10/1991 | Thalenfeld | |
| 5,066,149 A | 11/1991 | Wheeler et al. | |
| 5,067,784 A | 11/1991 | Debortoli et al. | |
| 5,071,211 A | 12/1991 | Debortoli et al. | |
| 5,071,220 A | 12/1991 | Ruello et al. | |
| 5,073,042 A | 12/1991 | Mulholland et al. | |
| 5,074,635 A | 12/1991 | Justice et al. | |
| 5,076,688 A | 12/1991 | Bowen et al. | |
| 5,080,459 A | 1/1992 | Wettengel et al. | |
| 5,100,221 A | 3/1992 | Carney et al. | |
| 5,104,336 A | 4/1992 | Hatanaka et al. | |
| 5,125,060 A | 6/1992 | Edmundson | |
| 5,127,082 A | 6/1992 | Below et al. | |
| 5,127,851 A | 7/1992 | Hilbert et al. | |
| 5,129,030 A | 7/1992 | Petrunia | |
| 5,129,607 A * | 7/1992 | Satoh | 248/73 |
| 5,133,039 A | 7/1992 | Dixit | |
| 5,138,678 A | 8/1992 | Briggs et al. | |
| 5,138,688 A | 8/1992 | Debortoli | |
| 5,142,598 A | 8/1992 | Tabone | |
| 5,142,607 A | 8/1992 | Petrotta et al. | |
| 5,150,277 A | 9/1992 | Bainbridge et al. | |
| D330,368 S | 10/1992 | Bourgeois et al. | |
| 5,152,760 A | 10/1992 | Latina | |
| 5,153,910 A | 10/1992 | Mickelson et al. | |
| 5,157,749 A | 10/1992 | Briggs et al. | |
| 5,167,001 A | 11/1992 | Debortoli et al. | |
| 5,170,452 A | 12/1992 | Ott | |
| 5,189,723 A | 2/1993 | Johnson et al. | |
| 5,199,099 A | 3/1993 | Dalgoutte | |
| 5,204,929 A | 4/1993 | Machall et al. | |
| 5,209,572 A | 5/1993 | Jordan | |
| 5,214,735 A | 5/1993 | Henneberger et al. | |
| 5,224,186 A | 6/1993 | Kishimoto et al. | |
| 5,230,492 A | 7/1993 | Zwart et al. | |
| 5,231,687 A | 7/1993 | Handley | |
| 5,231,688 A | 7/1993 | Zimmer | |
| 5,233,674 A | 8/1993 | Vladic | |
| 5,239,609 A | 8/1993 | Auteri | |
| 5,243,679 A | 9/1993 | Sharrow et al. | |
| 5,253,320 A | 10/1993 | Takahashi et al. | |
| 5,260,957 A | 11/1993 | Hakimi et al. | |
| 5,261,633 A | 11/1993 | Mastro | |
| 5,265,187 A | 11/1993 | Morin et al. | |
| 5,274,729 A | 12/1993 | King et al. | |
| 5,274,731 A | 12/1993 | White | |
| 5,278,933 A | 1/1994 | Hunsinger et al. | |
| 5,280,138 A | 1/1994 | Preston et al. | |
| 5,285,515 A | 2/1994 | Milanowski et al. | |
| 5,291,570 A | 3/1994 | Filgas et al. | |
| 5,315,679 A | 5/1994 | Baldwin et al. | |
| 5,317,663 A | 5/1994 | Beard et al. | |
| 5,323,478 A | 6/1994 | Milanowski et al. | |
| 5,323,480 A | 6/1994 | Mullaney et al. | |
| 5,329,520 A | 7/1994 | Richardson | |
| 5,333,193 A | 7/1994 | Cote et al. | |
| 5,333,221 A | 7/1994 | Briggs et al. | |
| 5,333,222 A | 7/1994 | Belenkiy et al. | |
| 5,337,400 A | 8/1994 | Morin et al. | |
| 5,339,379 A | 8/1994 | Kutsch et al. | |
| 5,347,603 A | 9/1994 | Belenkiy et al. | |
| 5,353,367 A | 10/1994 | Czosnowski et al. | |
| 5,359,688 A | 10/1994 | Underwood | |
| 5,363,466 A | 11/1994 | Milanowski et al. | |
| 5,363,467 A | 11/1994 | Keith | |
| 5,366,388 A | 11/1994 | Freeman et al. | |
| 5,367,598 A | 11/1994 | Devenish, III et al. | |
| 5,373,421 A | 12/1994 | Detsikas et al. | |
| 5,383,051 A | 1/1995 | Delrosso et al. | |
| 5,390,272 A | 2/1995 | Repta et al. | |
| 5,398,295 A | 3/1995 | Chang et al. | |
| 5,398,820 A * | 3/1995 | Kiss | 211/13.1 |
| 5,399,814 A | 3/1995 | Staber et al. | |
| 5,401,193 A | 3/1995 | Lo Cicero et al. | |
| 5,402,515 A | 3/1995 | Vidacovich et al. | |
| 5,408,557 A | 4/1995 | Hsu | |
| RE34,955 E | 5/1995 | Anton et al. | |
| 5,412,751 A | 5/1995 | Siemon et al. | |
| 5,416,837 A | 5/1995 | Cote et al. | |
| 5,418,874 A | 5/1995 | Carlisle et al. | |
| 5,420,956 A | 5/1995 | Grugel et al. | |
| 5,420,958 A | 5/1995 | Henson et al. | |
| 5,421,532 A | 6/1995 | Richter | |
| 5,438,641 A | 8/1995 | Malacarne | |
| 5,442,725 A | 8/1995 | Peng | |

(56) References Cited

U.S. PATENT DOCUMENTS

| | | |
|---|---|---|
| 5,442,726 A | 8/1995 | Howard et al. |
| 5,443,232 A | 8/1995 | Kesinger et al. |
| 5,444,804 A | 8/1995 | Yui et al. |
| 5,448,015 A | 9/1995 | Jamet et al. |
| 5,450,518 A | 9/1995 | Burek et al. |
| 5,458,019 A | 10/1995 | Trevino |
| 5,471,555 A | 11/1995 | Braga et al. |
| 5,479,505 A | 12/1995 | Butler et al. |
| 5,481,634 A | 1/1996 | Anderson et al. |
| 5,481,939 A | 1/1996 | Bernardini |
| 5,490,229 A | 2/1996 | Ghandeharizadeh et al. |
| 5,497,416 A | 3/1996 | Butler, III et al. |
| 5,497,444 A | 3/1996 | Wheeler |
| 5,511,144 A | 4/1996 | Hawkins et al. |
| 5,511,798 A | 4/1996 | Kawamoto et al. |
| 5,519,804 A | 5/1996 | Burek et al. |
| 5,530,786 A | 6/1996 | Radliff et al. |
| 5,535,970 A * | 7/1996 | Gobbi ........................ 248/74.2 |
| 5,538,213 A | 7/1996 | Brown |
| 5,542,015 A | 7/1996 | Hultermans |
| 5,546,495 A | 8/1996 | Bruckner et al. |
| 5,548,641 A | 8/1996 | Butler et al. |
| 5,553,183 A | 9/1996 | Bechamps |
| 5,553,186 A | 9/1996 | Allen |
| 5,563,971 A | 10/1996 | Abendschein |
| 5,572,617 A | 11/1996 | Bernhardt et al. |
| 5,575,680 A | 11/1996 | Suffi |
| 5,577,151 A | 11/1996 | Hoffer |
| 5,590,234 A | 12/1996 | Pulido |
| 5,595,507 A | 1/1997 | Braun et al. |
| 5,596,670 A | 1/1997 | Debortoli et al. |
| 5,600,020 A | 2/1997 | Wehle et al. |
| 5,602,954 A | 2/1997 | Nolf et al. |
| 5,608,606 A | 3/1997 | Blaney |
| 5,613,030 A | 3/1997 | Hoffer et al. |
| 5,617,501 A | 4/1997 | Miller et al. |
| 5,638,474 A | 6/1997 | Lampert et al. |
| 5,640,476 A | 6/1997 | Womack et al. |
| 5,640,482 A | 6/1997 | Barry et al. |
| 5,647,043 A | 7/1997 | Anderson et al. |
| 5,647,045 A | 7/1997 | Robinson et al. |
| 5,650,334 A | 7/1997 | Zuk et al. |
| 5,668,910 A | 9/1997 | Arnett |
| 5,668,911 A | 9/1997 | Debortoli |
| 5,671,273 A | 9/1997 | Lanquist |
| 5,689,605 A | 11/1997 | Cobb et al. |
| 5,689,607 A | 11/1997 | Vincent et al. |
| 5,692,079 A | 11/1997 | Iso |
| 5,694,511 A | 12/1997 | Pimpinella et al. |
| 5,701,380 A | 12/1997 | Larson et al. |
| 5,704,573 A * | 1/1998 | de Beers et al. ................. 248/73 |
| 5,708,742 A | 1/1998 | Beun et al. |
| 5,708,751 A | 1/1998 | Mattei |
| 5,710,851 A | 1/1998 | Walter et al. |
| 5,717,810 A | 2/1998 | Wheeler |
| 5,734,776 A | 3/1998 | Puetz |
| 5,740,300 A | 4/1998 | Hodge |
| 5,742,982 A | 4/1998 | Dodd et al. |
| 5,751,874 A | 5/1998 | Chudoba et al. |
| 5,751,882 A | 5/1998 | Daems et al. |
| 5,754,724 A | 5/1998 | Peterson et al. |
| 5,758,003 A | 5/1998 | Wheeler et al. |
| 5,758,004 A | 5/1998 | Alarcon et al. |
| 5,761,026 A | 6/1998 | Robinson et al. |
| 5,765,698 A | 6/1998 | Bullivant |
| 5,769,908 A | 6/1998 | Koppelman |
| 5,774,612 A | 6/1998 | Belenkiy et al. |
| 5,778,122 A | 7/1998 | Giebel et al. |
| 5,778,130 A | 7/1998 | Walters et al. |
| 5,781,686 A | 7/1998 | Robinson et al. |
| 5,788,087 A | 8/1998 | Orlando |
| 5,790,741 A | 8/1998 | Vincent et al. |
| 5,793,920 A | 8/1998 | Wilkins et al. |
| 5,793,921 A | 8/1998 | Wilkins et al. |
| 5,796,908 A | 8/1998 | Vicory |
| 5,823,646 A | 10/1998 | Arizpe et al. |
| 5,825,955 A | 10/1998 | Ernst et al. |
| 5,825,961 A | 10/1998 | Wilkins et al. |
| 5,828,807 A | 10/1998 | Tucker et al. |
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,870,519 A | 2/1999 | Jenkins et al. |
| 5,874,733 A | 2/1999 | Silver et al. |
| 5,877,565 A | 3/1999 | Hollenbach et al. |
| 5,880,864 A | 3/1999 | Williams et al. |
| 5,881,200 A | 3/1999 | Burt |
| 5,883,995 A | 3/1999 | Lu |
| 5,884,003 A | 3/1999 | Cloud et al. |
| 5,887,095 A | 3/1999 | Nagase et al. |
| 5,887,106 A | 3/1999 | Cheeseman et al. |
| 5,892,877 A | 4/1999 | Meyerhoefer |
| 5,894,540 A | 4/1999 | Drewing |
| 5,901,220 A | 5/1999 | Garver et al. |
| 5,903,693 A | 5/1999 | Brown |
| 5,906,342 A * | 5/1999 | Kraus ........................ 248/74.1 |
| 5,909,298 A | 6/1999 | Shimada et al. |
| 5,913,006 A | 6/1999 | Summach |
| 5,914,976 A | 6/1999 | Jayaraman et al. |
| 5,915,055 A | 6/1999 | Bennett et al. |
| 5,923,804 A | 7/1999 | Rosson |
| 5,930,425 A | 7/1999 | Abel et al. |
| 5,933,557 A | 8/1999 | Ott |
| 5,940,563 A | 8/1999 | Kobayashi et al. |
| 5,943,460 A | 8/1999 | Mead et al. |
| 5,945,633 A | 8/1999 | Ott et al. |
| 5,946,440 A | 8/1999 | Puetz |
| 5,949,946 A | 9/1999 | Debortoli et al. |
| 5,953,962 A | 9/1999 | Hewson |
| 5,956,439 A | 9/1999 | Pimpinella |
| 5,956,444 A | 9/1999 | Duda et al. |
| 5,956,449 A | 9/1999 | Otani et al. |
| 5,966,492 A | 10/1999 | Bechamps et al. |
| 5,969,294 A | 10/1999 | Eberle et al. |
| 5,975,769 A | 11/1999 | Larson et al. |
| 5,978,540 A | 11/1999 | Bechamps et al. |
| 5,980,303 A | 11/1999 | Lee et al. |
| 5,993,071 A | 11/1999 | Hultermans |
| 5,995,700 A | 11/1999 | Burek et al. |
| 5,999,393 A | 12/1999 | Brower |
| 6,001,831 A | 12/1999 | Papenfuhs et al. |
| 6,009,224 A | 12/1999 | Allen |
| 6,009,225 A | 12/1999 | Ray et al. |
| 6,011,831 A | 1/2000 | Nieves et al. |
| 6,027,252 A | 2/2000 | Erdman et al. |
| 6,027,352 A | 2/2000 | Byrne |
| 6,041,042 A | 3/2000 | Bussiere |
| 6,044,193 A | 3/2000 | Szentesi et al. |
| 6,058,235 A | 5/2000 | Hiramatsu et al. |
| 6,061,492 A | 5/2000 | Strause et al. |
| 6,078,661 A | 6/2000 | Arnett et al. |
| 6,079,881 A | 6/2000 | Roth |
| 6,088,497 A | 7/2000 | Phillips et al. |
| 6,118,075 A | 9/2000 | Baker et al. |
| 6,127,627 A | 10/2000 | Daoud |
| 6,130,983 A | 10/2000 | Cheng |
| 6,134,370 A | 10/2000 | Childers et al. |
| 6,149,313 A | 11/2000 | Giebel et al. |
| 6,149,315 A | 11/2000 | Stephenson |
| 6,151,432 A | 11/2000 | Nakajima et al. |
| 6,160,946 A | 12/2000 | Thompson et al. |
| 6,170,784 B1 | 1/2001 | MacDonald et al. |
| 6,172,782 B1 | 1/2001 | Kobayashi |
| 6,175,079 B1 | 1/2001 | Johnston et al. |
| 6,181,861 B1 | 1/2001 | Wenski et al. |
| 6,188,687 B1 | 2/2001 | Mussman et al. |
| 6,188,825 B1 | 2/2001 | Bandy et al. |
| 6,192,180 B1 | 2/2001 | Kim et al. |
| 6,201,920 B1 | 3/2001 | Noble et al. |
| 6,208,796 B1 | 3/2001 | Williams Vigliaturo |
| 6,212,324 B1 * | 4/2001 | Lin et al. ........................ 385/136 |
| 6,215,938 B1 | 4/2001 | Reitmeier et al. |
| 6,216,987 B1 * | 4/2001 | Fukuo ........................ 248/74.2 |

(56) References Cited

U.S. PATENT DOCUMENTS

| | | |
|---|---|---|
| 6,227,717 B1 | 5/2001 | Ott et al. |
| 6,229,948 B1 | 5/2001 | Blee et al. |
| 6,234,683 B1 | 5/2001 | Waldron et al. |
| 6,234,685 B1 | 5/2001 | Carlisle et al. |
| 6,236,795 B1 | 5/2001 | Rodgers |
| 6,240,229 B1 | 5/2001 | Roth |
| 6,243,522 B1 | 6/2001 | Allan et al. |
| 6,245,998 B1 | 6/2001 | Curry et al. |
| 6,247,851 B1 | 6/2001 | Ichihara |
| 6,259,850 B1 | 7/2001 | Crosby, Jr. et al. |
| 6,263,141 B1 | 7/2001 | Smith |
| 6,265,680 B1 | 7/2001 | Robertson |
| 6,269,212 B1 | 7/2001 | Schiattone |
| 6,273,532 B1 | 8/2001 | Chen et al. |
| 6,275,641 B1 | 8/2001 | Daoud |
| 6,278,829 B1 | 8/2001 | BuAbbud et al. |
| 6,278,831 B1 | 8/2001 | Henderson et al. |
| D448,005 S | 9/2001 | Klein, Jr. et al. |
| 6,289,618 B1 | 9/2001 | Kump et al. |
| 6,292,614 B1 | 9/2001 | Smith et al. |
| 6,301,424 B1 | 10/2001 | Hwang |
| 6,305,848 B1 | 10/2001 | Gregory |
| 6,307,997 B1 | 10/2001 | Walters et al. |
| 6,318,824 B1 | 11/2001 | LaGrotta et al. |
| 6,321,017 B1 | 11/2001 | Janus et al. |
| 6,322,279 B1 | 11/2001 | Yamamoto et al. |
| 6,324,575 B1 | 11/2001 | Jain et al. |
| 6,325,549 B1 | 12/2001 | Shevchuk |
| 6,327,059 B1 | 12/2001 | Bhalla et al. |
| RE37,489 E | 1/2002 | Anton et al. |
| 6,343,313 B1 | 1/2002 | Salesky et al. |
| 6,344,615 B1 | 2/2002 | Nolf et al. |
| 6,347,888 B1 | 2/2002 | Puetz |
| 6,353,696 B1 | 3/2002 | Gordon et al. |
| 6,353,697 B1 | 3/2002 | Daoud |
| 6,357,712 B1 | 3/2002 | Lu |
| 6,359,228 B1 | 3/2002 | Strause et al. |
| 6,363,198 B1 | 3/2002 | Braga et al. |
| 6,363,200 B1 | 3/2002 | Thompson et al. |
| 6,370,309 B1 | 4/2002 | Daoud |
| 6,371,419 B1 * | 4/2002 | Ohnuki ..................... 248/74.2 |
| 6,375,129 B2 | 4/2002 | Koziol |
| 6,377,218 B1 | 4/2002 | Nelson et al. |
| 6,379,052 B1 | 4/2002 | De Jong et al. |
| 6,381,642 B1 | 4/2002 | O'Donnell et al. |
| 6,385,374 B2 | 5/2002 | Kropp |
| 6,385,381 B1 | 5/2002 | Janus et al. |
| 6,389,214 B1 | 5/2002 | Smith et al. |
| 6,397,166 B1 | 5/2002 | Leung et al. |
| 6,398,149 B1 * | 6/2002 | Hines et al. .................. 242/399 |
| 6,406,314 B1 | 6/2002 | Byrne |
| 6,411,767 B1 | 6/2002 | Burrous et al. |
| 6,412,986 B1 | 7/2002 | Ngo et al. |
| 6,418,262 B1 | 7/2002 | Puetz et al. |
| 6,419,519 B1 | 7/2002 | Young |
| 6,424,781 B1 | 7/2002 | Puetz et al. |
| 6,425,694 B1 | 7/2002 | Szilagyi et al. |
| 6,427,045 B1 | 7/2002 | Matthes et al. |
| 6,431,762 B1 | 8/2002 | Taira et al. |
| 6,434,313 B1 | 8/2002 | Clapp, Jr. et al. |
| 6,438,310 B1 | 8/2002 | Lance et al. |
| 6,452,925 B1 | 9/2002 | Sistanizadeh et al. |
| 6,456,773 B1 | 9/2002 | Keys |
| 6,464,402 B1 | 10/2002 | Andrews et al. |
| 6,466,724 B1 | 10/2002 | Glover et al. |
| 6,469,905 B1 | 10/2002 | Hwang |
| D466,087 S | 11/2002 | Cuny et al. |
| 6,478,472 B1 | 11/2002 | Anderson et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,958 B1 | 11/2002 | Xue et al. |
| 6,494,550 B1 | 12/2002 | Chen et al. |
| 6,496,640 B1 | 12/2002 | Harvey et al. |
| 6,504,988 B1 | 1/2003 | Trebesch et al. |
| 6,507,980 B2 | 1/2003 | Bremicker |
| 6,510,274 B1 * | 1/2003 | Wu et al. ........................ 385/137 |
| 6,532,332 B2 | 3/2003 | Solheid et al. |
| 6,533,472 B1 | 3/2003 | Dinh et al. |
| 6,535,397 B2 | 3/2003 | Clark et al. |
| 6,535,682 B1 | 3/2003 | Puetz et al. |
| 6,539,147 B1 | 3/2003 | Mahony |
| 6,539,160 B2 | 3/2003 | Battey et al. |
| 6,542,688 B1 | 4/2003 | Battey et al. |
| 6,544,075 B1 | 4/2003 | Liao |
| 6,550,977 B2 | 4/2003 | Hizuka |
| 6,554,485 B1 | 4/2003 | Beatty et al. |
| 6,560,334 B1 | 5/2003 | Mullaney et al. |
| 6,567,601 B2 | 5/2003 | Daoud et al. |
| 6,568,542 B1 | 5/2003 | Chen |
| 6,571,048 B1 | 5/2003 | Bechamps et al. |
| 6,577,595 B1 | 6/2003 | Counterman |
| 6,577,801 B2 | 6/2003 | Broderick et al. |
| 6,579,014 B2 | 6/2003 | Melton et al. |
| 6,584,267 B1 | 6/2003 | Caveney et al. |
| 6,585,423 B1 | 7/2003 | Vergeest |
| 6,587,630 B2 | 7/2003 | Spence et al. |
| 6,588,938 B1 | 7/2003 | Lampert et al. |
| 6,591,051 B2 | 7/2003 | Solheid et al. |
| 6,591,053 B2 | 7/2003 | Fritz |
| 6,592,266 B1 | 7/2003 | Hankins et al. |
| 6,597,670 B1 | 7/2003 | Tweedy et al. |
| 6,600,106 B2 | 7/2003 | Standish et al. |
| 6,600,866 B2 | 7/2003 | Gatica et al. |
| 6,601,997 B2 | 8/2003 | Ngo |
| 6,612,515 B1 | 9/2003 | Tinucci et al. |
| 6,612,874 B1 | 9/2003 | Stout et al. |
| 6,614,978 B1 | 9/2003 | Caveney |
| 6,614,980 B1 | 9/2003 | Mahony |
| 6,621,975 B2 | 9/2003 | Laporte et al. |
| 6,622,873 B2 | 9/2003 | Hegrenes et al. |
| 6,624,389 B1 | 9/2003 | Cox |
| 6,625,374 B2 | 9/2003 | Holman et al. |
| 6,625,375 B1 | 9/2003 | Mahony |
| 6,631,237 B2 | 10/2003 | Knudsen et al. |
| 6,640,042 B2 | 10/2003 | Araki et al. |
| RE38,311 E | 11/2003 | Wheeler |
| 6,644,863 B1 | 11/2003 | Azami et al. |
| 6,647,197 B1 | 11/2003 | Marrs et al. |
| 6,648,520 B2 | 11/2003 | McDonald et al. |
| 6,654,536 B2 | 11/2003 | Battey et al. |
| 6,668,127 B1 | 12/2003 | Mahony |
| 6,669,149 B2 * | 12/2003 | Akizuki ........................ 248/71 |
| 6,677,520 B1 | 1/2004 | Kim et al. |
| 6,679,604 B1 | 1/2004 | Bove et al. |
| 6,684,005 B1 | 1/2004 | Egnell et al. |
| 6,687,450 B1 | 2/2004 | Kempeneers et al. |
| 6,693,552 B1 | 2/2004 | Herzig et al. |
| 6,695,620 B1 | 2/2004 | Huang |
| 6,701,056 B2 | 3/2004 | Burek et al. |
| 6,710,366 B1 | 3/2004 | Lee et al. |
| 6,715,619 B2 | 4/2004 | Kim et al. |
| 6,719,149 B2 | 4/2004 | Tomino |
| 6,721,482 B1 | 4/2004 | Glynn |
| 6,741,784 B1 | 5/2004 | Guan |
| 6,741,785 B2 | 5/2004 | Barthel et al. |
| 6,746,037 B1 | 6/2004 | Kaplenski et al. |
| 6,748,154 B2 | 6/2004 | O'Leary et al. |
| 6,748,155 B2 | 6/2004 | Kim et al. |
| 6,758,600 B2 | 7/2004 | Del Grosso et al. |
| 6,768,860 B2 | 7/2004 | Liberty |
| 6,771,861 B2 | 8/2004 | Wagner et al. |
| 6,773,297 B2 | 8/2004 | Komiya |
| 6,778,525 B1 | 8/2004 | Baum et al. |
| 6,778,752 B2 | 8/2004 | Laporte et al. |
| 6,786,647 B1 | 9/2004 | Hinds et al. |
| 6,786,743 B2 | 9/2004 | Huang |
| 6,786,896 B1 | 9/2004 | Madhani et al. |
| 6,788,871 B2 | 9/2004 | Taylor |
| 6,792,190 B2 | 9/2004 | Xin et al. |
| 6,798,751 B1 | 9/2004 | Voit et al. |
| 6,804,447 B2 | 10/2004 | Smith et al. |
| 6,810,194 B2 | 10/2004 | Griffiths et al. |
| 6,813,412 B2 | 11/2004 | Lin |

(56) References Cited

U.S. PATENT DOCUMENTS

| | | | |
|---|---|---|---|
| 6,816,660 B2 | 11/2004 | Nashimoto | |
| 6,818,834 B1 | 11/2004 | Lin | |
| 6,819,856 B2 | 11/2004 | Dagley et al. | |
| 6,819,857 B2 | 11/2004 | Douglas et al. | |
| 6,822,874 B1 | 11/2004 | Marler | |
| 6,826,174 B1 | 11/2004 | Erekson et al. | |
| 6,826,346 B2 | 11/2004 | Sloan et al. | |
| 6,826,631 B2 | 11/2004 | Webb | |
| 6,830,489 B2 | 12/2004 | Aoyama | |
| 6,839,428 B2 | 1/2005 | Brower et al. | |
| 6,839,438 B1 | 1/2005 | Riegelsberger et al. | |
| 6,840,815 B2 | 1/2005 | Musolf et al. | |
| 6,845,207 B2 | 1/2005 | Schray | |
| 6,847,614 B2 | 1/2005 | Banker et al. | |
| 6,848,862 B1 | 2/2005 | Schlig | |
| 6,850,685 B2 | 2/2005 | Tinucci et al. | |
| 6,853,637 B1 | 2/2005 | Norrell et al. | |
| 6,854,894 B1 | 2/2005 | Yunker et al. | |
| 6,856,334 B1 | 2/2005 | Fukui | |
| 6,863,444 B2 | 3/2005 | Anderson et al. | |
| 6,865,331 B2 | 3/2005 | Mertesdorf | |
| 6,865,334 B2 | 3/2005 | Cooke et al. | |
| 6,866,541 B2 | 3/2005 | Barker et al. | |
| 6,868,216 B1 | 3/2005 | Gehrke | |
| 6,869,227 B2 | 3/2005 | Del Grosso et al. | |
| 6,870,734 B2 | 3/2005 | Mertesdorf et al. | |
| 6,870,997 B2 | 3/2005 | Cooke | |
| 6,879,545 B2 | 4/2005 | Cooke et al. | |
| 6,915,058 B2 | 7/2005 | Pons | |
| 6,920,273 B2 | 7/2005 | Knudsen | |
| 6,920,274 B2 | 7/2005 | Rapp et al. | |
| 6,923,406 B2* | 8/2005 | Akizuki | 248/71 |
| 6,925,241 B2 | 8/2005 | Bohle et al. | |
| 6,934,451 B2 | 8/2005 | Cooke | |
| 6,934,456 B2 | 8/2005 | Ferris et al. | |
| 6,935,598 B2* | 8/2005 | Sono et al. | 248/71 |
| 6,937,807 B2 | 8/2005 | Franklin et al. | |
| 6,944,383 B1 | 9/2005 | Herzog et al. | |
| 6,944,389 B2 | 9/2005 | Giraud et al. | |
| 6,945,701 B2 | 9/2005 | Trezza et al. | |
| 6,952,530 B2 | 10/2005 | Helvajian et al. | |
| 6,963,690 B1 | 11/2005 | Kassal et al. | |
| 6,968,107 B2 | 11/2005 | Belardi et al. | |
| 6,968,111 B2 | 11/2005 | Trebesch et al. | |
| 6,985,665 B2 | 1/2006 | Baechtle | |
| 6,993,237 B2 | 1/2006 | Cooke et al. | |
| 7,000,784 B2 | 2/2006 | Canty et al. | |
| 7,005,582 B2 | 2/2006 | Muller et al. | |
| 7,006,748 B2 | 2/2006 | Dagley et al. | |
| 7,007,296 B2 | 2/2006 | Rakib | |
| 7,025,275 B2 | 4/2006 | Huang et al. | |
| 7,027,695 B2 | 4/2006 | Cooke et al. | |
| 7,027,706 B2 | 4/2006 | Diaz et al. | |
| 7,031,588 B2 | 4/2006 | Cowley et al. | |
| 7,035,510 B2 | 4/2006 | Zimmel et al. | |
| 7,038,137 B2 | 5/2006 | Grubish et al. | |
| 7,048,447 B1 | 5/2006 | Patel et al. | |
| 7,054,513 B2 | 5/2006 | Herz et al. | |
| 7,066,748 B2 | 6/2006 | Bricaud et al. | |
| 7,068,907 B2 | 6/2006 | Schray | |
| 7,070,459 B2 | 7/2006 | Denovich et al. | |
| 7,077,710 B2 | 7/2006 | Haggay et al. | |
| 7,079,744 B2 | 7/2006 | Douglas et al. | |
| 7,090,406 B2 | 8/2006 | Melton et al. | |
| 7,090,407 B2 | 8/2006 | Melton et al. | |
| 7,094,095 B1 | 8/2006 | Caveney | |
| 7,097,047 B2 | 8/2006 | Lee et al. | |
| 7,101,093 B2 | 9/2006 | Hsiao et al. | |
| 7,102,884 B2 | 9/2006 | Mertesdorf et al. | |
| 7,103,255 B2 | 9/2006 | Reagan et al. | |
| 7,110,654 B2 | 9/2006 | Dillat | |
| 7,111,990 B2 | 9/2006 | Melton et al. | |
| 7,113,679 B2 | 9/2006 | Melton et al. | |
| 7,113,686 B2 | 9/2006 | Bellekens et al. | |
| 7,113,687 B2 | 9/2006 | Womack et al. | |
| 7,116,491 B1 | 10/2006 | Willey et al. | |
| 7,116,883 B2 | 10/2006 | Kline et al. | |
| 7,118,281 B2 | 10/2006 | Chiu et al. | |
| 7,118,405 B2 | 10/2006 | Peng | |
| 7,120,347 B2 | 10/2006 | Blackwell, Jr. et al. | |
| 7,120,348 B2 | 10/2006 | Trebesch et al. | |
| 7,120,349 B2 | 10/2006 | Elliott | |
| 7,127,143 B2 | 10/2006 | Elkins, II et al. | |
| 7,128,471 B2 | 10/2006 | Wilson | |
| 7,136,555 B2 | 11/2006 | Theuerkorn et al. | |
| 7,139,462 B1 | 11/2006 | Richtman | |
| 7,140,903 B2 | 11/2006 | Pulizzi et al. | |
| 7,147,383 B2 | 12/2006 | Sullivan | |
| 7,170,466 B2 | 1/2007 | Janoschka | |
| 7,171,099 B2 | 1/2007 | Barnes et al. | |
| 7,171,121 B1 | 1/2007 | Skarica et al. | |
| 7,181,142 B1 | 2/2007 | Xu et al. | |
| 7,186,134 B2 | 3/2007 | Togami et al. | |
| 7,193,783 B2 | 3/2007 | Willey et al. | |
| 7,194,181 B2 | 3/2007 | Holmberg et al. | |
| 7,195,521 B2 | 3/2007 | Musolf et al. | |
| 7,200,314 B2 | 4/2007 | Womack et al. | |
| 7,200,316 B2 | 4/2007 | Giraud et al. | |
| 7,201,595 B1 | 4/2007 | Morello | |
| 7,217,040 B2 | 5/2007 | Crews et al. | |
| 7,218,526 B2 | 5/2007 | Mayer | |
| 7,220,065 B2 | 5/2007 | Han et al. | |
| 7,221,832 B2 | 5/2007 | Tinucci | |
| 7,228,036 B2 | 6/2007 | Elkins, II et al. | |
| 7,228,047 B2 | 6/2007 | Szilagyi et al. | |
| 7,231,125 B2 | 6/2007 | Douglas et al. | |
| 7,234,878 B2 | 6/2007 | Yamauchi et al. | |
| 7,236,677 B2 | 6/2007 | Escoto et al. | |
| 7,239,789 B2 | 7/2007 | Grubish et al. | |
| 7,245,809 B1 | 7/2007 | Gniadek et al. | |
| 7,259,325 B2 | 8/2007 | Pincu et al. | |
| 7,266,283 B2 | 9/2007 | Kline et al. | |
| 7,270,485 B1 | 9/2007 | Robinson et al. | |
| 7,272,291 B2 | 9/2007 | Bayazit et al. | |
| 7,274,852 B1 | 9/2007 | Smrha et al. | |
| 7,284,785 B2 | 10/2007 | Gotou et al. | |
| 7,287,913 B2 | 10/2007 | Keenum et al. | |
| 7,289,731 B2 | 10/2007 | Thinguldstad | |
| 7,292,769 B2 | 11/2007 | Watanabe et al. | |
| 7,298,950 B2 | 11/2007 | Frohlich | |
| 7,300,216 B2 | 11/2007 | Morse et al. | |
| 7,300,308 B2 | 11/2007 | Laursen et al. | |
| 7,302,149 B2 | 11/2007 | Swam et al. | |
| 7,302,153 B2 | 11/2007 | Thom | |
| 7,302,154 B2 | 11/2007 | Trebesch et al. | |
| 7,308,184 B2 | 12/2007 | Barnes et al. | |
| 7,310,471 B2 | 12/2007 | Bayazit et al. | |
| 7,310,472 B2 | 12/2007 | Haberman | |
| 7,315,681 B2 | 1/2008 | Kewitsch | |
| 7,325,975 B2 | 2/2008 | Yamada et al. | |
| 7,330,624 B2 | 2/2008 | Isenhour et al. | |
| 7,330,625 B2 | 2/2008 | Barth | |
| 7,330,626 B2 | 2/2008 | Kowalczyk et al. | |
| 7,330,629 B2 | 2/2008 | Cooke et al. | |
| 7,331,718 B2 | 2/2008 | Yazaki et al. | |
| 7,340,145 B2 | 3/2008 | Allen | |
| 7,349,615 B2 | 3/2008 | Frazier et al. | |
| 7,352,946 B2 | 4/2008 | Heller et al. | |
| 7,352,947 B2 | 4/2008 | Phung et al. | |
| 7,373,071 B2 | 5/2008 | Douglas et al. | |
| 7,376,321 B2 | 5/2008 | Bolster et al. | |
| 7,376,323 B2 | 5/2008 | Zimmel | |
| 7,391,952 B1 | 6/2008 | Ugolini et al. | |
| 7,397,996 B2 | 7/2008 | Herzog et al. | |
| 7,400,813 B2 | 7/2008 | Zimmel | |
| 7,404,736 B2 | 7/2008 | Herbst et al. | |
| 7,409,137 B2 | 8/2008 | Barnes | |
| 7,414,198 B2 | 8/2008 | Stansbie et al. | |
| 7,417,188 B2 | 8/2008 | McNutt et al. | |
| 7,418,182 B2 | 8/2008 | Krampotich | |
| 7,418,184 B1 | 8/2008 | Gonzales et al. | |
| 7,421,182 B2 | 9/2008 | Bayazit et al. | |
| 7,428,363 B2 | 9/2008 | Leon et al. | |
| 7,435,090 B1 | 10/2008 | Schriefer et al. | |

(56) References Cited

U.S. PATENT DOCUMENTS

| | | | |
|---|---|---|---|
| 7,437,049 B2 | 10/2008 | Krampotich | |
| 7,439,453 B2 | 10/2008 | Murano et al. | |
| 7,454,113 B2 | 11/2008 | Barnes | |
| 7,460,757 B2 | 12/2008 | Hoehne et al. | |
| 7,460,758 B2 | 12/2008 | Xin | |
| 7,461,981 B2 | 12/2008 | Yow, Jr. et al. | |
| 7,462,779 B2 | 12/2008 | Caveney et al. | |
| 7,463,810 B2 | 12/2008 | Bayazit et al. | |
| 7,463,811 B2 | 12/2008 | Trebesch et al. | |
| 7,469,090 B2 | 12/2008 | Ferris et al. | |
| 7,471,867 B2 | 12/2008 | Vogel et al. | |
| 7,474,828 B2 | 1/2009 | Leon et al. | |
| 7,477,824 B2 | 1/2009 | Reagan et al. | |
| 7,477,826 B2 | 1/2009 | Mullaney et al. | |
| 7,480,438 B2 | 1/2009 | Douglas et al. | |
| 7,488,205 B2 | 2/2009 | Spisany et al. | |
| 7,493,002 B2 | 2/2009 | Coburn et al. | |
| 7,496,269 B1 | 2/2009 | Lee | |
| 7,499,622 B2 | 3/2009 | Castonguay et al. | |
| 7,499,623 B2 | 3/2009 | Barnes et al. | |
| 7,507,111 B2 | 3/2009 | Togami et al. | |
| 7,509,015 B2 | 3/2009 | Murano | |
| 7,509,016 B2 | 3/2009 | Smith et al. | |
| 7,510,421 B2 | 3/2009 | Fransen et al. | |
| 7,522,804 B2 | 4/2009 | Araki et al. | |
| 7,523,898 B1 * | 4/2009 | Barry et al. | 248/71 |
| 7,526,171 B2 | 4/2009 | Caveney et al. | |
| 7,526,172 B2 | 4/2009 | Gniadek et al. | |
| 7,526,174 B2 | 4/2009 | Leon et al. | |
| 7,529,458 B2 | 5/2009 | Spisany et al. | |
| 7,534,958 B2 | 5/2009 | McNutt et al. | |
| 7,536,075 B2 | 5/2009 | Zimmel | |
| 7,540,666 B2 | 6/2009 | Luther et al. | |
| 7,542,645 B1 | 6/2009 | Hua et al. | |
| 7,544,085 B2 | 6/2009 | Baldwin et al. | |
| 7,552,899 B2 | 6/2009 | Chen et al. | |
| 7,555,193 B2 | 6/2009 | Rapp et al. | |
| 7,558,458 B2 | 7/2009 | Gronvall et al. | |
| 7,565,051 B2 | 7/2009 | Vongseng | |
| 7,567,744 B2 | 7/2009 | Krampotich et al. | |
| 7,570,860 B2 | 8/2009 | Smrha et al. | |
| 7,570,861 B2 | 8/2009 | Smrha et al. | |
| 7,577,331 B2 | 8/2009 | Laurisch et al. | |
| 7,596,293 B2 | 9/2009 | Isenhour et al. | |
| 7,603,020 B1 | 10/2009 | Wakileh et al. | |
| 7,607,938 B2 | 10/2009 | Clark et al. | |
| 7,609,967 B2 | 10/2009 | Hochbaum et al. | |
| 7,613,377 B2 | 11/2009 | Gonzales et al. | |
| 7,614,903 B1 | 11/2009 | Huang | |
| 7,620,272 B2 | 11/2009 | Hino et al. | |
| 7,620,287 B2 | 11/2009 | Appenzeller et al. | |
| 7,641,398 B2 | 1/2010 | O'Riorden et al. | |
| 7,668,430 B2 | 2/2010 | McClellan et al. | |
| 7,668,433 B2 | 2/2010 | Bayazit et al. | |
| 7,672,561 B1 | 3/2010 | Keith et al. | |
| 7,676,135 B2 | 3/2010 | Chen | |
| 7,689,079 B2 | 3/2010 | Burnham et al. | |
| 7,694,926 B2 | 4/2010 | Allen et al. | |
| 7,697,811 B2 | 4/2010 | Murano et al. | |
| 7,706,294 B2 | 4/2010 | Natarajan et al. | |
| 7,715,125 B2 | 5/2010 | Willey | |
| 7,715,683 B2 | 5/2010 | Kowalczyk et al. | |
| 7,734,138 B2 | 6/2010 | Bloodworth et al. | |
| 7,740,409 B2 | 6/2010 | Bolton et al. | |
| 7,743,495 B2 | 6/2010 | Mori et al. | |
| 7,751,674 B2 | 7/2010 | Hill | |
| 7,751,675 B2 | 7/2010 | Holmberg et al. | |
| 7,756,371 B1 | 7/2010 | Burnham et al. | |
| 7,756,382 B2 | 7/2010 | Saravanos et al. | |
| 7,760,984 B2 | 7/2010 | Solheid et al. | |
| 7,764,858 B2 | 7/2010 | Bayazit et al. | |
| 7,764,859 B2 | 7/2010 | Krampotich et al. | |
| 7,769,266 B2 | 8/2010 | Morris | |
| 7,805,044 B2 | 9/2010 | Reagan et al. | |
| 7,809,235 B2 | 10/2010 | Reagan et al. | |
| 7,811,136 B1 | 10/2010 | Hsieh et al. | |
| 7,822,310 B2 | 10/2010 | Castonguay et al. | |
| 7,837,495 B2 | 11/2010 | Baldwin et al. | |
| 7,850,372 B2 | 12/2010 | Nishimura et al. | |
| 7,853,112 B2 | 12/2010 | Zimmel et al. | |
| 7,856,166 B2 | 12/2010 | Biribuze et al. | |
| 7,862,369 B2 | 1/2011 | Gimenes et al. | |
| 7,869,685 B2 | 1/2011 | Hendrickson et al. | |
| 7,876,580 B2 | 1/2011 | Mayer | |
| 7,899,298 B2 | 3/2011 | Cox et al. | |
| 7,914,332 B2 | 3/2011 | Song et al. | |
| 7,942,589 B2 | 5/2011 | Yazaki et al. | |
| 7,945,135 B2 | 5/2011 | Cooke et al. | |
| 7,945,136 B2 | 5/2011 | Cooke et al. | |
| 7,945,138 B2 | 5/2011 | Hill et al. | |
| 7,970,250 B2 | 6/2011 | Morris | |
| 7,991,252 B2 | 8/2011 | Cheng et al. | |
| 8,009,959 B2 | 8/2011 | Barnes et al. | |
| 8,014,171 B2 | 9/2011 | Kelly et al. | |
| 8,014,646 B2 | 9/2011 | Keith et al. | |
| 8,020,813 B1 | 9/2011 | Clark et al. | |
| 8,059,932 B2 | 11/2011 | Hill et al. | |
| 8,093,499 B2 | 1/2012 | Hoffer et al. | |
| 8,107,785 B2 | 1/2012 | Berglund et al. | |
| 8,131,126 B2 | 3/2012 | Kowalczyk et al. | |
| 8,184,938 B2 | 5/2012 | Cooke et al. | |
| 8,206,043 B2 | 6/2012 | Thirugnanam et al. | |
| 8,206,058 B2 | 6/2012 | Vrondran et al. | |
| 8,220,881 B2 | 7/2012 | Keith | |
| 8,226,305 B2 | 7/2012 | Thirugnanam et al. | |
| 8,249,410 B2 | 8/2012 | Andrus et al. | |
| 8,251,591 B2 | 8/2012 | Barnes et al. | |
| 8,270,798 B2 | 9/2012 | Dagley et al. | |
| 8,280,216 B2 | 10/2012 | Cooke et al. | |
| 8,285,104 B2 | 10/2012 | Davis et al. | |
| 8,301,004 B2 | 10/2012 | Cooke et al. | |
| 8,331,752 B2 | 12/2012 | Biribuze | |
| 8,353,494 B2 | 1/2013 | Peng et al. | |
| 8,369,679 B2 | 2/2013 | Wakileh et al. | |
| 8,391,666 B2 | 3/2013 | Hetzer et al. | |
| 8,472,773 B2 | 6/2013 | de Jong | |
| 8,491,331 B2 | 7/2013 | Follingstad | |
| 8,528,872 B2 | 9/2013 | Mattlin et al. | |
| 8,537,477 B2 | 9/2013 | Shioda | |
| 8,538,226 B2 | 9/2013 | Makrides-Saravanos et al. | |
| 8,559,783 B2 | 10/2013 | Campos et al. | |
| 2001/0010741 A1 | 8/2001 | Hizuka | |
| 2001/0029125 A1 | 10/2001 | Morita et al. | |
| 2002/0010818 A1 | 1/2002 | Wei et al. | |
| 2002/0012353 A1 | 1/2002 | Gerszberg et al. | |
| 2002/0034290 A1 | 3/2002 | Pershan | |
| 2002/0037139 A1 | 3/2002 | Asao et al. | |
| 2002/0064364 A1 | 5/2002 | Battey et al. | |
| 2002/0131730 A1 | 9/2002 | Keeble et al. | |
| 2002/0136519 A1 * | 9/2002 | Tinucci et al. | 385/134 |
| 2002/0141724 A1 | 10/2002 | Ogawa et al. | |
| 2002/0150372 A1 * | 10/2002 | Schray | 385/135 |
| 2002/0172467 A1 | 11/2002 | Anderson et al. | |
| 2002/0180163 A1 | 12/2002 | Muller et al. | |
| 2002/0181918 A1 | 12/2002 | Spence et al. | |
| 2002/0181922 A1 | 12/2002 | Xin et al. | |
| 2002/0191939 A1 | 12/2002 | Daoud et al. | |
| 2002/0194596 A1 | 12/2002 | Srivastava | |
| 2003/0002802 A1 | 1/2003 | Trezza et al. | |
| 2003/0007743 A1 | 1/2003 | Asada | |
| 2003/0007767 A1 | 1/2003 | Douglas et al. | |
| 2003/0011855 A1 | 1/2003 | Fujiwara | |
| 2003/0021539 A1 | 1/2003 | Kwon et al. | |
| 2003/0036748 A1 | 2/2003 | Cooper et al. | |
| 2003/0051026 A1 | 3/2003 | Carter et al. | |
| 2003/0066998 A1 | 4/2003 | Lee | |
| 2003/0086675 A1 * | 5/2003 | Wu et al. | 385/137 |
| 2003/0095753 A1 | 5/2003 | Wada et al. | |
| 2003/0147604 A1 | 8/2003 | Tapia et al. | |
| 2003/0156552 A1 | 8/2003 | Banker et al. | |
| 2003/0174996 A1 * | 9/2003 | Henschel et al. | 385/135 |
| 2003/0180004 A1 | 9/2003 | Cox et al. | |
| 2003/0180012 A1 | 9/2003 | Deane et al. | |
| 2003/0183413 A1 | 10/2003 | Kato | |

(56) References Cited

U.S. PATENT DOCUMENTS

| | | |
|---|---|---|
| 2003/0199201 A1 | 10/2003 | Mullaney et al. |
| 2003/0210882 A1 | 11/2003 | Barthel et al. |
| 2003/0223723 A1 | 12/2003 | Massey et al. |
| 2003/0223725 A1 | 12/2003 | Laporte et al. |
| 2003/0235387 A1* | 12/2003 | Dufour .................. 385/136 |
| 2004/0001717 A1 | 1/2004 | Bennett et al. |
| 2004/0013389 A1 | 1/2004 | Taylor |
| 2004/0013390 A1 | 1/2004 | Kim et al. |
| 2004/0022494 A1 | 2/2004 | Liddle et al. |
| 2004/0024934 A1 | 2/2004 | Webb |
| 2004/0067036 A1 | 4/2004 | Clark et al. |
| 2004/0074852 A1 | 4/2004 | Knudsen et al. |
| 2004/0086238 A1 | 5/2004 | Finona et al. |
| 2004/0086252 A1 | 5/2004 | Smith et al. |
| 2004/0120679 A1 | 6/2004 | Vincent et al. |
| 2004/0147159 A1 | 7/2004 | Urban et al. |
| 2004/0151465 A1* | 8/2004 | Krampotich et al. ......... 385/136 |
| 2004/0175090 A1 | 9/2004 | Vastmans et al. |
| 2004/0192115 A1 | 9/2004 | Bugg |
| 2004/0196841 A1 | 10/2004 | Tudor et al. |
| 2004/0208459 A1 | 10/2004 | Mizue et al. |
| 2004/0228598 A1 | 11/2004 | Allen et al. |
| 2004/0240827 A1 | 12/2004 | Daoud et al. |
| 2004/0240882 A1 | 12/2004 | Lipski et al. |
| 2004/0264873 A1 | 12/2004 | Smith et al. |
| 2005/0002633 A1 | 1/2005 | Solheid et al. |
| 2005/0008131 A1 | 1/2005 | Cook |
| 2005/0026497 A1 | 2/2005 | Holliday |
| 2005/0036749 A1 | 2/2005 | Vogel et al. |
| 2005/0067358 A1 | 3/2005 | Lee et al. |
| 2005/0069248 A1 | 3/2005 | Jasti et al. |
| 2005/0074990 A1 | 4/2005 | Shearman et al. |
| 2005/0076149 A1 | 4/2005 | McKown et al. |
| 2005/0083959 A1 | 4/2005 | Binder |
| 2005/0107086 A1 | 5/2005 | Tell et al. |
| 2005/0111809 A1 | 5/2005 | Giraud et al. |
| 2005/0111810 A1 | 5/2005 | Giraud et al. |
| 2005/0123261 A1 | 6/2005 | Bellekens et al. |
| 2005/0129379 A1 | 6/2005 | Reagan et al. |
| 2005/0175293 A1 | 8/2005 | Byers et al. |
| 2005/0178573 A1 | 8/2005 | James |
| 2005/0201073 A1 | 9/2005 | Pincu et al. |
| 2005/0232566 A1 | 10/2005 | Rapp et al. |
| 2005/0233647 A1 | 10/2005 | Denovich et al. |
| 2005/0254757 A1 | 11/2005 | Ferretti, III et al. |
| 2005/0281526 A1 | 12/2005 | Vongseng et al. |
| 2005/0281527 A1 | 12/2005 | Wilson et al. |
| 2005/0285493 A1 | 12/2005 | Hu et al. |
| 2006/0007562 A1 | 1/2006 | Willey et al. |
| 2006/0018448 A1 | 1/2006 | Stevens et al. |
| 2006/0018622 A1 | 1/2006 | Caveney |
| 2006/0034048 A1 | 2/2006 | Xu |
| 2006/0039290 A1 | 2/2006 | Roden et al. |
| 2006/0044774 A1 | 3/2006 | Vasavda et al. |
| 2006/0045458 A1 | 3/2006 | Sasaki et al. |
| 2006/0072606 A1 | 4/2006 | Posthuma |
| 2006/0077968 A1 | 4/2006 | Pitsoulakis et al. |
| 2006/0093303 A1 | 5/2006 | Reagan et al. |
| 2006/0110118 A1 | 5/2006 | Escoto et al. |
| 2006/0127026 A1 | 6/2006 | Beck |
| 2006/0133736 A1 | 6/2006 | Sullivan |
| 2006/0133759 A1 | 6/2006 | Mullaney et al. |
| 2006/0147172 A1 | 7/2006 | Luther et al. |
| 2006/0153517 A1 | 7/2006 | Reagan et al. |
| 2006/0160377 A1 | 7/2006 | Huang |
| 2006/0165365 A1 | 7/2006 | Feustel et al. |
| 2006/0165366 A1 | 7/2006 | Feustel et al. |
| 2006/0191700 A1 | 8/2006 | Herzog et al. |
| 2006/0193590 A1 | 8/2006 | Puetz et al. |
| 2006/0193591 A1 | 8/2006 | Rapp et al. |
| 2006/0198098 A1 | 9/2006 | Clark et al. |
| 2006/0204179 A1 | 9/2006 | Patel et al. |
| 2006/0215980 A1 | 9/2006 | Bayazit et al. |
| 2006/0225912 A1 | 10/2006 | Clark et al. |
| 2006/0228087 A1 | 10/2006 | Bayazit et al. |
| 2006/0269194 A1 | 11/2006 | Luther et al. |
| 2006/0269206 A1 | 11/2006 | Zimmel |
| 2006/0269208 A1 | 11/2006 | Allen et al. |
| 2006/0275008 A1 | 12/2006 | Xin |
| 2006/0275009 A1 | 12/2006 | Ellison et al. |
| 2006/0285812 A1 | 12/2006 | Ferris et al. |
| 2007/0003204 A1 | 1/2007 | Makrides-Saravanos et al. |
| 2007/0025070 A1 | 2/2007 | Jiang et al. |
| 2007/0031099 A1 | 2/2007 | Herzog et al. |
| 2007/0033629 A1 | 2/2007 | McGranahan et al. |
| 2007/0047894 A1 | 3/2007 | Holmberg et al. |
| 2007/0058641 A1 | 3/2007 | Cicchetti et al. |
| 2007/0086723 A1 | 4/2007 | Sasaki et al. |
| 2007/0104447 A1 | 5/2007 | Allen |
| 2007/0110373 A1 | 5/2007 | Dudek et al. |
| 2007/0127201 A1 | 6/2007 | Mertesdorf et al. |
| 2007/0131628 A1 | 6/2007 | Mimlitch, III et al. |
| 2007/0183732 A1 | 8/2007 | Wittmeier et al. |
| 2007/0189692 A1 | 8/2007 | Zimmel et al. |
| 2007/0196071 A1 | 8/2007 | Laursen et al. |
| 2007/0221793 A1* | 9/2007 | Kusuda et al. ................. 248/71 |
| 2007/0237484 A1 | 10/2007 | Reagan et al. |
| 2007/0257159 A1 | 11/2007 | Nelson et al. |
| 2007/0266192 A1 | 11/2007 | Campini et al. |
| 2007/0274718 A1 | 11/2007 | Bridges et al. |
| 2008/0011514 A1 | 1/2008 | Zheng et al. |
| 2008/0025683 A1 | 1/2008 | Murano |
| 2008/0031585 A1 | 2/2008 | Solheid et al. |
| 2008/0063350 A1 | 3/2008 | Trebesch et al. |
| 2008/0068788 A1 | 3/2008 | Ozawa et al. |
| 2008/0069511 A1 | 3/2008 | Blackwell, Jr. et al. |
| 2008/0069512 A1 | 3/2008 | Barnes et al. |
| 2008/0078899 A1 | 4/2008 | Chen et al. |
| 2008/0080826 A1 | 4/2008 | Leon et al. |
| 2008/0080827 A1 | 4/2008 | Leon et al. |
| 2008/0080828 A1 | 4/2008 | Leon et al. |
| 2008/0085094 A1 | 4/2008 | Krampotich |
| 2008/0089656 A1 | 4/2008 | Wagner et al. |
| 2008/0095502 A1 | 4/2008 | McColloch |
| 2008/0095541 A1 | 4/2008 | Dallesasse |
| 2008/0100440 A1 | 5/2008 | Downie et al. |
| 2008/0106871 A1 | 5/2008 | James |
| 2008/0112681 A1 | 5/2008 | Battey et al. |
| 2008/0118207 A1 | 5/2008 | Yamamoto et al. |
| 2008/0121423 A1* | 5/2008 | Vogel et al. ................... 174/480 |
| 2008/0124039 A1 | 5/2008 | Gniadek et al. |
| 2008/0131068 A1 | 6/2008 | Mertesdorf et al. |
| 2008/0145013 A1 | 6/2008 | Escoto et al. |
| 2008/0152294 A1 | 6/2008 | Hirano et al. |
| 2008/0166094 A1 | 7/2008 | Bookbinder et al. |
| 2008/0166131 A1 | 7/2008 | Hudgins et al. |
| 2008/0175550 A1 | 7/2008 | Coburn et al. |
| 2008/0175551 A1 | 7/2008 | Smrha et al. |
| 2008/0175552 A1 | 7/2008 | Smrha et al. |
| 2008/0193091 A1 | 8/2008 | Herbst |
| 2008/0205823 A1 | 8/2008 | Luther et al. |
| 2008/0205843 A1 | 8/2008 | Castonguay et al. |
| 2008/0205844 A1 | 8/2008 | Castonguay et al. |
| 2008/0212928 A1 | 9/2008 | Kowalczyk et al. |
| 2008/0219632 A1 | 9/2008 | Smith et al. |
| 2008/0219634 A1 | 9/2008 | Rapp et al. |
| 2008/0236858 A1 | 10/2008 | Quijano |
| 2008/0247723 A1 | 10/2008 | Herzog et al. |
| 2008/0267573 A1 | 10/2008 | Douglas et al. |
| 2008/0285934 A1 | 11/2008 | Standish et al. |
| 2008/0292261 A1 | 11/2008 | Kowalczyk et al. |
| 2008/0296060 A1 | 12/2008 | Hawley et al. |
| 2008/0298763 A1 | 12/2008 | Appenzeller et al. |
| 2008/0304803 A1 | 12/2008 | Krampotich et al. |
| 2008/0310810 A1 | 12/2008 | Gallagher |
| 2009/0010607 A1 | 1/2009 | Elisson et al. |
| 2009/0016685 A1 | 1/2009 | Hudgins et al. |
| 2009/0022470 A1 | 1/2009 | Krampotich |
| 2009/0038845 A1 | 2/2009 | Fransen et al. |
| 2009/0060439 A1 | 3/2009 | Cox et al. |
| 2009/0060440 A1 | 3/2009 | Wright et al. |
| 2009/0067800 A1 | 3/2009 | Vazquez et al. |
| 2009/0074371 A1 | 3/2009 | Bayazit et al. |
| 2009/0080849 A1 | 3/2009 | Hankins et al. |

(56) References Cited

U.S. PATENT DOCUMENTS

| | | |
|---|---|---|
| 2009/0097813 A1 | 4/2009 | Hill |
| 2009/0110347 A1 | 4/2009 | Jacobsson |
| 2009/0121092 A1 | 5/2009 | Keith |
| 2009/0136194 A1 | 5/2009 | Barnes |
| 2009/0136195 A1 | 5/2009 | Smrha et al. |
| 2009/0136196 A1 | 5/2009 | Trebesch et al. |
| 2009/0146342 A1 | 6/2009 | Haney et al. |
| 2009/0148117 A1 | 6/2009 | Laurisch |
| 2009/0166404 A1 | 7/2009 | German et al. |
| 2009/0169163 A1 | 7/2009 | Abbott, III et al. |
| 2009/0175588 A1 | 7/2009 | Brandt et al. |
| 2009/0180749 A1 | 7/2009 | Douglas et al. |
| 2009/0184221 A1 | 7/2009 | Sculler |
| 2009/0185782 A1 | 7/2009 | Parikh et al. |
| 2009/0191891 A1 | 7/2009 | Ma et al. |
| 2009/0194647 A1 | 8/2009 | Keith |
| 2009/0196563 A1 | 8/2009 | Mullsteff et al. |
| 2009/0202214 A1 | 8/2009 | Holmberg et al. |
| 2009/0207577 A1 | 8/2009 | Fransen et al. |
| 2009/0208178 A1 | 8/2009 | Kowalczyk et al. |
| 2009/0208210 A1 | 8/2009 | Trojer et al. |
| 2009/0212679 A1 | 8/2009 | Frousiakis et al. |
| 2009/0214171 A1 | 8/2009 | Coburn et al. |
| 2009/0220200 A1 | 9/2009 | Sheau Tung Wong et al. |
| 2009/0220204 A1 | 9/2009 | Ruiz |
| 2009/0226142 A1 | 9/2009 | Barnes et al. |
| 2009/0238531 A1 | 9/2009 | Holmberg et al. |
| 2009/0245743 A1 | 10/2009 | Cote et al. |
| 2009/0252472 A1 | 10/2009 | Solheid et al. |
| 2009/0257726 A1 | 10/2009 | Redmann et al. |
| 2009/0257727 A1 | 10/2009 | Laurisch et al. |
| 2009/0257754 A1 | 10/2009 | Theodoras, II et al. |
| 2009/0263096 A1 | 10/2009 | Solheid et al. |
| 2009/0263122 A1 | 10/2009 | Helkey et al. |
| 2009/0267865 A1 | 10/2009 | Miller et al. |
| 2009/0269016 A1 | 10/2009 | Korampally et al. |
| 2009/0269018 A1 | 10/2009 | Fr hlich et al. |
| 2009/0269019 A1 | 10/2009 | Andrus et al. |
| 2009/0274429 A1 | 11/2009 | Krampotich et al. |
| 2009/0274430 A1 | 11/2009 | Krampotich et al. |
| 2009/0274432 A1 | 11/2009 | Iwaya |
| 2009/0290842 A1 | 11/2009 | Bran De Leon et al. |
| 2009/0297111 A1 | 12/2009 | Reagan et al. |
| 2009/0304342 A1 | 12/2009 | Adomeit et al. |
| 2009/0324189 A1 | 12/2009 | Hill et al. |
| 2010/0003000 A1 | 1/2010 | Rapp et al. |
| 2010/0012671 A1 | 1/2010 | Vrondran et al. |
| 2010/0027953 A1 | 2/2010 | Russell |
| 2010/0054681 A1 | 3/2010 | Biribuze et al. |
| 2010/0054682 A1 | 3/2010 | Cooke et al. |
| 2010/0054683 A1 | 3/2010 | Cooke et al. |
| 2010/0054684 A1 | 3/2010 | Cooke et al. |
| 2010/0054685 A1 | 3/2010 | Cooke et al. |
| 2010/0054686 A1 | 3/2010 | Cooke et al. |
| 2010/0054687 A1 | 3/2010 | Ye et al. |
| 2010/0061691 A1 | 3/2010 | Murano et al. |
| 2010/0061693 A1 | 3/2010 | Bran De Leon et al. |
| 2010/0074587 A1 | 3/2010 | Loeffelholz et al. |
| 2010/0080517 A1 | 4/2010 | Cline et al. |
| 2010/0086267 A1 | 4/2010 | Cooke et al. |
| 2010/0086274 A1 | 4/2010 | Keith |
| 2010/0111483 A1 | 5/2010 | Reinhardt et al. |
| 2010/0119201 A1 | 5/2010 | Smrha et al. |
| 2010/0129035 A1 | 5/2010 | Teo |
| 2010/0142544 A1 | 6/2010 | Chapel et al. |
| 2010/0142910 A1 | 6/2010 | Hill et al. |
| 2010/0150518 A1 | 6/2010 | Leon et al. |
| 2010/0158467 A1 | 6/2010 | Hou et al. |
| 2010/0166377 A1 | 7/2010 | Nair et al. |
| 2010/0178022 A1 | 7/2010 | Schroeder et al. |
| 2010/0202740 A1 | 8/2010 | Barlowe et al. |
| 2010/0202745 A1 | 8/2010 | Sokolowski et al. |
| 2010/0202748 A1 | 8/2010 | Pierce et al. |
| 2010/0220967 A1 | 9/2010 | Cooke et al. |
| 2010/0220968 A1 | 9/2010 | Dagley et al. |
| 2010/0247051 A1 | 9/2010 | Kowalczyk et al. |
| 2010/0266245 A1 | 10/2010 | Sabo |
| 2010/0278499 A1 | 11/2010 | Mures et al. |
| 2010/0296790 A1 | 11/2010 | Cooke et al. |
| 2010/0296791 A1 | 11/2010 | Makrides-Saravanos et al. |
| 2010/0310225 A1 | 12/2010 | Anderson et al. |
| 2010/0310226 A1 | 12/2010 | Wakileh et al. |
| 2010/0316334 A1 | 12/2010 | Kewitsch |
| 2010/0322554 A1 | 12/2010 | Barnes et al. |
| 2010/0322579 A1 | 12/2010 | Cooke et al. |
| 2010/0322580 A1 | 12/2010 | Beamon et al. |
| 2010/0322581 A1 | 12/2010 | Cooke et al. |
| 2010/0322582 A1 | 12/2010 | Cooke et al. |
| 2010/0322583 A1 | 12/2010 | Cooke et al. |
| 2010/0329624 A1 | 12/2010 | Zhou et al. |
| 2011/0008004 A1 | 1/2011 | Liao et al. |
| 2011/0069931 A1 | 3/2011 | Cote et al. |
| 2011/0073730 A1* | 3/2011 | Kitchen .................. 248/220.31 |
| 2011/0085774 A1 | 4/2011 | Murphy et al. |
| 2011/0085776 A1 | 4/2011 | Biribuze et al. |
| 2011/0097053 A1 | 4/2011 | Smith et al. |
| 2011/0097977 A1* | 4/2011 | Bubnick et al. .................. 451/56 |
| 2011/0129185 A1 | 6/2011 | Lewallen et al. |
| 2011/0129186 A1 | 6/2011 | Lewallen et al. |
| 2011/0186532 A1 | 8/2011 | Wu |
| 2011/0192631 A1 | 8/2011 | Burek et al. |
| 2011/0211799 A1 | 9/2011 | Conner et al. |
| 2011/0217014 A1 | 9/2011 | Dominique |
| 2011/0217016 A1 | 9/2011 | Mullsteff |
| 2011/0222821 A1 | 9/2011 | Pitwon et al. |
| 2011/0249950 A1 | 10/2011 | Chapa Ramirez et al. |
| 2011/0268404 A1 | 11/2011 | Cote et al. |
| 2011/0268405 A1 | 11/2011 | Cote et al. |
| 2011/0268407 A1 | 11/2011 | Cowen et al. |
| 2011/0268408 A1 | 11/2011 | Giraud et al. |
| 2011/0268413 A1 | 11/2011 | Cote et al. |
| 2011/0280537 A1 | 11/2011 | Cowen et al. |
| 2012/0025683 A1 | 2/2012 | Mattlin et al. |
| 2012/0051707 A1 | 3/2012 | Barnes et al. |
| 2012/0057838 A1 | 3/2012 | Hill et al. |
| 2012/0106899 A1 | 5/2012 | Choi |
| 2012/0183263 A1 | 7/2012 | Wu |
| 2012/0183289 A1 | 7/2012 | Lou et al. |
| 2012/0219263 A1 | 8/2012 | Beamon et al. |
| 2012/0288244 A1 | 11/2012 | Wu et al. |
| 2012/0288248 A1 | 11/2012 | Chapa Ramirez et al. |
| 2012/0301083 A1 | 11/2012 | Carter et al. |
| 2013/0004136 A1 | 1/2013 | Brower et al. |
| 2013/0058616 A1 | 3/2013 | Cote et al. |
| 2013/0077927 A1 | 3/2013 | O'Connor |
| 2013/0214108 A1 | 8/2013 | Irudayaraj et al. |
| 2013/0266282 A1 | 10/2013 | Cote et al. |
| 2013/0308916 A1 | 11/2013 | Buff et al. |
| 2014/0003782 A1 | 1/2014 | Blackwell, Jr. et al. |
| 2014/0010510 A1 | 1/2014 | Blackard |
| 2014/0112628 A1 | 4/2014 | Keenum et al. |

FOREIGN PATENT DOCUMENTS

| | | |
|---|---|---|
| CA | 2186314 A1 | 4/1997 |
| CA | 2765835 A1 | 1/2011 |
| CH | 688705 A5 | 1/1998 |
| CN | 102460258 A | 5/2012 |
| DE | 8711970 U1 | 10/1987 |
| DE | 3726718 A1 | 2/1989 |
| DE | 3726719 A1 | 2/1989 |
| DE | 4030301 A1 | 3/1992 |
| DE | 4231181 C1 | 8/1993 |
| DE | 20115940 U1 | 1/2002 |
| DE | 10338848 A1 | 3/2005 |
| DE | 202005009932 U1 | 11/2005 |
| DE | 102007024476 A1 | 11/2008 |
| EP | 29512 A1 | 6/1981 |
| EP | 0105597 A2 | 4/1984 |
| EP | 0250900 A2 | 1/1988 |
| EP | 0408266 A2 | 1/1991 |
| EP | 0474091 A1 | 8/1991 |
| EP | 0468671 A1 | 1/1992 |
| EP | 0490698 A1 | 6/1992 |

(56) References Cited

FOREIGN PATENT DOCUMENTS

| | | |
|---|---|---|
| EP | 0529830 A1 | 3/1993 |
| EP | 0544004 A1 | 6/1993 |
| EP | 0547778 A1 | 6/1993 |
| EP | 0581527 A1 | 2/1994 |
| EP | 0620462 A1 | 10/1994 |
| EP | 0693699 A1 | 1/1996 |
| EP | 0720322 A2 | 7/1996 |
| EP | 0776557 B1 | 6/1997 |
| EP | 0940700 A2 | 9/1999 |
| EP | 0949522 A2 | 10/1999 |
| EP | 1041417 A2 | 10/2000 |
| EP | 1056177 A1 | 11/2000 |
| EP | 1065542 A1 | 1/2001 |
| EP | 1162485 A2 | 12/2001 |
| EP | 1203974 A2 | 5/2002 |
| EP | 1289319 A2 | 3/2003 |
| EP | 1310816 A2 | 5/2003 |
| EP | 1316829 A2 | 6/2003 |
| EP | 1367308 A1 | 12/2003 |
| EP | 1621907 A1 | 2/2006 |
| EP | 1777563 A1 | 4/2007 |
| EP | 2159613 A2 | 3/2010 |
| FR | 1586331 A | 2/1970 |
| FR | 2378378 A1 | 8/1978 |
| GB | 2241591 A | 9/1991 |
| GB | 2277812 A | 11/1994 |
| GB | 2367379 A | 4/2002 |
| GB | 2377839 A | 1/2003 |
| JP | 3060994 A | 3/1991 |
| JP | 3172806 A | 7/1991 |
| JP | 3281378 A | 12/1991 |
| JP | 5045541 A | 2/1993 |
| JP | 6018749 A | 1/1994 |
| JP | 06018749 A | 1/1994 |
| JP | 7308011 A | 11/1995 |
| JP | 7318761 A | 12/1995 |
| JP | 8007308 A | 1/1996 |
| JP | 8248235 A | 9/1996 |
| JP | 8248237 A | 9/1996 |
| JP | 3487946 A | 10/1996 |
| JP | 8254620 A | 10/1996 |
| JP | 3279474 A | 10/1997 |
| JP | 9258033 A | 10/1997 |
| JP | 9258055 A | 10/1997 |
| JP | 2771870 B2 | 7/1998 |
| JP | 3448448 A | 8/1998 |
| JP | 10227919 A | 8/1998 |
| JP | 3478944 A | 12/1998 |
| JP | 10332945 A | 12/1998 |
| JP | 10339817 A | 12/1998 |
| JP | 11023858 A | 1/1999 |
| JP | 2000098138 A | 4/2000 |
| JP | 2000098139 A | 4/2000 |
| JP | 2000241631 A | 9/2000 |
| JP | 2001004849 A | 1/2001 |
| JP | 3160322 B2 | 4/2001 |
| JP | 2001133636 A | 5/2001 |
| JP | 3173962 B2 | 6/2001 |
| JP | 3176906 B2 | 6/2001 |
| JP | 2001154030 A | 6/2001 |
| JP | 2001159714 A | 6/2001 |
| JP | 2002022974 A | 1/2002 |
| JP | 2002077236 A | 3/2002 |
| JP | 2002116337 A | 4/2002 |
| JP | 2002169035 A | 6/2002 |
| JP | 3312893 B2 | 8/2002 |
| JP | 200133636 A | 8/2002 |
| JP | 2002305389 A | 10/2002 |
| JP | 3344701 B2 | 11/2002 |
| JP | 2003029054 A | 1/2003 |
| JP | 3403573 B2 | 5/2003 |
| JP | 2003169026 A | 6/2003 |
| JP | 2003215353 A | 7/2003 |
| JP | 2003344701 A | 12/2003 |
| JP | 3516765 B2 | 4/2004 |
| JP | 2004144808 A | 5/2004 |
| JP | 2004514931 A | 5/2004 |
| JP | 3542939 B2 | 7/2004 |
| JP | 2004246147 A | 9/2004 |
| JP | 2004361652 A | 12/2004 |
| JP | 2004361893 A | 12/2004 |
| JP | 3107704 U | 2/2005 |
| JP | 2005055748 A | 3/2005 |
| JP | 2005062569 A | 3/2005 |
| JP | 2005084241 A | 3/2005 |
| JP | 2005148327 A | 6/2005 |
| JP | 3763645 | 4/2006 |
| JP | 3763645 B2 | 4/2006 |
| JP | 3778021 B2 | 5/2006 |
| JP | 2006126513 A | 5/2006 |
| JP | 2006126516 A | 5/2006 |
| JP | 3794540 B2 | 7/2006 |
| JP | 2006227041 A1 | 8/2006 |
| JP | 3833638 B2 | 10/2006 |
| JP | 3841344 B2 | 11/2006 |
| JP | 3847533 B2 | 11/2006 |
| JP | 200747336 A | 2/2007 |
| JP | 3896035 B2 | 3/2007 |
| JP | 2007067458 A1 | 3/2007 |
| JP | 3934052 B2 | 6/2007 |
| JP | 3964191 B2 | 8/2007 |
| JP | 3989853 B2 | 10/2007 |
| JP | 4026244 B2 | 12/2007 |
| JP | 4029494 B2 | 1/2008 |
| JP | 4065223 B2 | 3/2008 |
| JP | 4093475 B2 | 6/2008 |
| JP | 4105696 B2 | 6/2008 |
| JP | 4112437 B2 | 7/2008 |
| JP | 4118862 B2 | 7/2008 |
| JP | 2008176118 A1 | 7/2008 |
| JP | 2008180817 A1 | 8/2008 |
| JP | 4184329 B2 | 11/2008 |
| JP | 2008271017 A | 11/2008 |
| JP | 2008542822 T | 11/2008 |
| JP | 2009503582 T | 1/2009 |
| JP | 2009229506 A | 10/2009 |
| JP | 2012065019 A | 3/2012 |
| KR | 20110037404 A | 4/2011 |
| WO | 9105281 A1 | 4/1991 |
| WO | 9326070 A1 | 12/1993 |
| WO | 9520175 A1 | 7/1995 |
| WO | 9636896 A1 | 11/1996 |
| WO | 9712268 A1 | 4/1997 |
| WO | 9736197 A1 | 10/1997 |
| WO | 97/44605 | 11/1997 ................ F16K 3/22 |
| WO | 9825416 A1 | 6/1998 |
| WO | 9927404 A1 | 6/1999 |
| WO | 0005611 A2 | 2/2000 |
| WO | 0127660 A2 | 4/2001 |
| WO | 0130007 A2 | 4/2001 |
| WO | 0180596 A1 | 10/2001 |
| WO | 0242818 A1 | 5/2002 |
| WO | 03009527 A2 | 1/2003 |
| WO | 03014943 A2 | 2/2003 |
| WO | 2004052066 A1 | 6/2004 |
| WO | 2006076062 A | 7/2006 |
| WO | 2006108024 A1 | 10/2006 |
| WO | 2007050515 A1 | 5/2007 |
| WO | 2007079074 A1 | 7/2007 |
| WO | 2007149215 A2 | 12/2007 |
| WO | 2008027201 A2 | 3/2008 |
| WO | 2008063054 A2 | 5/2008 |
| WO | 2008113054 A2 | 9/2008 |
| WO | 2008157248 A1 | 12/2008 |
| WO | 2009026688 A1 | 3/2009 |
| WO | 2009030360 A1 | 3/2009 |
| WO | 2009120280 A2 | 10/2009 |
| WO | 2010024847 A2 | 3/2010 |
| WO | 2010080745 A1 | 7/2010 |

(56) References Cited

FOREIGN PATENT DOCUMENTS

| WO | 2011005461 A1 | 1/2011 |
|---|---|---|
| WO | 2011011510 A2 | 1/2011 |

OTHER PUBLICATIONS

Non-final Office Action for U.S. Appl. No. 12/751,884 mailed Feb. 15, 2013, 5 pages.
Non-final Office Action for U.S. Appl. No. 12/394,114 mailed Feb. 27, 2013, 8 pages.
Non-final Office Action for U.S. Appl. No. 12/819,065 mailed Mar. 4, 2013, 7 pages.
Final Office Action for U.S. Appl. No. 12/952,960 mailed Mar. 7, 2013, 13 pages.
Notice of Allowance for U.S. Appl. No. 12/732,487 mailed Mar. 19, 2013, 11 pages.
Non-final Office Action for U.S. Appl. No. 12/953,134 mailed Mar. 21, 2013, 9 pages.
Final Office Action for U.S. Appl. No. 12/641,617 mailed May 10, 2013, 21 pages.
Non-Final Office Action for U.S. Appl. No. 12/953,039 mailed Jan. 11, 2013, 6 pages.
Non-Final Office Action for U.S. Appl. No. 12/953,118 mailed Jan. 7, 2013, 9 pages.
Non-Final Office Action for U.S. Appl. No. 12/707,889 mailed Jan. 2, 2013, 7 pages.
Examination Report for European patent application 09789090.9-2216 mailed Aug. 29, 2011, 4 pages.
Examination Report for European patent application 09789090.9-2216 mailed Mar. 30, 2012, 6 pages.
Written Opinion of the International Searching Authority for International patent application PCT/US2009004548, mailed Apr. 5, 2011, 6 pages.
European Search Report for European patent application 09789090.9-2217 mailed Jan. 24, 2013, 5 pages.
Final Office Action for U.S. Appl. No. 12/915,682 mailed Apr. 18, 2013, 9 pages.
Advisory Action for U.S. Appl. No. 12/952,960 mailed May 15, 2013, 2 pages.
Non-final Office Action for U.S. Appl. No. 12/952,960 mailed Jun. 20, 2013, 13 pages.
Non-final Office Action for U.S. Appl. No. 11/820,300 mailed Apr. 25, 2012, 10 pages.
Final Office Action for U.S. Appl. No. 12/871,052 mailed Jul. 1, 2013, 12 pages.
Non-final Office Action for U.S. Appl. No. 12/940,699 mailed Jun. 26, 2013, 9 pages.
Notice of Allowance for U.S. Appl. No. 13/090,621 mailed Jun. 25, 2013, 8 pages.
Non-Final Rejection mailed Sep. 7, 2010, for U.S. Appl. No. 12/323,423, 18 pages.
Notice of Allowance for U.S. Appl. 12/323,423 mailed Jan. 24, 2012, 8 pages.
Examiner's Answer mailed Mar. 4, 2011, for U.S. Appl. No. 12/323,415, 11 pages.
Final Rejection mailed Jun. 25, 2010, for U.S. Appl. No. 12/323,415, 10 pages.
Non-Final Rejection mailed Aug. 5, 2011, for U.S. Appl. No. 12/323,415, 41 pages.
Non-final Office Action for U.S. Appl. No. 12/323,415 mailed Apr. 23, 2012, 11 pages.
Non-Final Rejection mailed Dec. 10, 2009, for U.S. Appl. No. 12/323,415, 7 pages.
Examiner's Answer to Appeal Brief for U.S. Appl. 11/320,062 mailed Dec. 8, 2011, 8 pages.
Final Office Action for U.S. Appl. No. 11/320,062 mailed Mar. 8, 2011, 8 pages.
Non-final Office Action for U.S. Appl. No. 11/320,062 mailed Jan. 15, 2010, 11 pages.
Non-final Office Action for U.S. Appl. No. 12/320,062 mailed Sep. 30, 2010, 7 pages.
Final Office Action for U.S. Appl. No. 11/439,086 mailed Feb. 4, 2010, 14 pages.
Non-final Office Action for U.S. Appl. No. 11/439,086 mailed May 3, 2010, 11 pages.
Non-final Office Action for U.S. Appl. No. 11/439,086 mailed Sep. 21, 2009, 10 pages.
Final Office Action for U.S. Appl. No. 12/079,481 mailed Mar. 18, 2010, 10 pages.
Non-final Office Action for U.S. Appl. No. 12/079,481 mailed Dec. 26, 2008, 9 pages.
Non-final Office Action for U.S. Appl. No. 12/079,481 mailed Sep. 16, 2009, 10 pages.
Notice of Allowance for U.S. Appl. No. 12/079,481 mailed Jun. 3, 2010, 6 pages.
Notice of Allowance for U.S. Appl. No. 12/079,481 mailed Oct. 4, 2010, 4 pages.
Non-final Office Action for U.S. Appl. No. 12/576,806 mailed Dec. 13, 2011, 6 pages.
Notice of Allowance for U.S. Appl. No. 12/576,806 mailed Apr. 18, 2012, 5 pages.
Notice of Allowance for U.S. Appl. No. 12/415,454 mailed Jun. 19, 2012, 5 pages.
Non-final Office Action for U.S. Appl. No. 12/323,373 mailed May 3, 2012, 7 pages.
Non-final Office Action for U.S. Appl. No. 11/809,474 mailed Apr. 8, 2008, 13 pages.
Non-final Office Action for U.S. Appl. No. 11/809,474 mailed Nov. 13, 2008, 10 pages.
Notice of Allowance for U.S. Appl. No. 11/809,474 mailed Jul. 6, 2009, 6 pages.
Final Office Action for U.S. Appl. No. 11/320,031 mailed Mar. 8, 2011, 8 pages.
Non-final Office Action for U.S. Appl. No. 11/320,031 mailed Jan. 5, 2010, 16 pages.
Non-final Office Action for U.S. Appl. No. 11/320,031 mailed Sep. 30, 2010, 7 pages.
Notice of Allowance for U.S. Appl. No. 11/320,031 mailed Nov. 15, 2011, 7 pages.
Non-final Office Action for U.S. Appl. No. 12/157,622 mailed Mar. 31, 2009, 9 pages.
Non-final Office Action for U.S. Appl. No. 12/157,622 mailed Oct. 15, 2009, 9 pages.
Notice of Allowance for U.S. Appl. No. 12/157,622 mailed Apr. 22, 2010, 4 pages.
Non-final Office Action for U.S. Appl. No. 12/323,395 mailed Dec. 8, 2011, 7 pages.
Non-final Office Action for U.S. Appl. No. 12/415,454 mailed Mar. 2, 2012, 5 pages.
Non-final Office Action for U.S. Appl. No. 12/415,454 mailed Sep. 6, 2011, 7 pages.
Notice of Allowance for U.S. Appl. No. 12/415,454 mailed Jan. 13, 2012, 5 pages.
Non-final Office Action for U.S. Appl. No. 12/576,769 mailed Feb. 2, 2012, 23 pages.
Non-final Office Action for U.S. Appl. No. 12/732,487 mailed Sep. 19, 2012, 22 pages.
Non-final Office Action for U.S. Appl. No. 12/818,986 mailed Feb. 3, 2012, 12 pages.
Final Office Action for U.S. Appl. No. 12/818,986 mailed Oct. 18, 2012, 13 pages.
Non-final Office Action for U.S. Appl. No. 12/915,682 mailed Oct. 24, 2012, 8 pages.
Non-final Office Action for U.S. Appl. No. 12/952,960 mailed Oct. 4, 2012, 11 pages.
Non-final Office Action for U.S. Appl. 12/953,134 mailed Sep. 25, 2012, 8 pages.
Non-final Office Action for U.S. Appl. No. 12/952,912 mailed Dec. 28, 2012, 9 pages.
Non-final Office Action for U.S. Appl. No. 12/946,139 mailed Jul. 26, 2012, 12 pages.

(56) References Cited

OTHER PUBLICATIONS

European Search Report for patent application 10790017.7 mailed Nov. 8, 2012, 7 pages.
Notice of Allowance for U.S. Appl. No. 13/090,621 mailed Apr. 22, 2013, 8 pages.
Final Office Action for U.S. Appl. No. 12/953,039 mailed May 1, 2013, 8 pages.
Final Office Action for U.S. Appl. No. 12/953,118 mailed May 3, 2013, 11 pages.
International Search Report for PCT/US2009/066779 mailed Aug. 27, 2010, 3 pages.
"MPO Fiber Optic Rack Panels now available from L-com Connectivity Products," article dated Jun. 4, 2007, 16 pages, http://www.l-com.com/content/Article.aspx?Type=P&ID=438.
"19 Rack Panel with 16 MPO Fiber Optic Couplers—1U high," product page, accessed Oct. 23, 2012, 2 pages, http://www.l-com.com/item.aspx?id=9767#.UlbgG8XXay5.
"Drawing for L-com 1U Panel with 16 MTP couplers," May 15, 2007, 1 page, http://www.l-com.com/multimedia/eng.drawings/PR17516MTP.pdf.
"RapidNet Fibre MTP VHD Cassette," Brochure, Date Unknown, 1 page, http://www.hellermanntyton.se/documents/5000/576_fiber_1U.pdf.
"MPO for Gigabit Ethernet/FAS-NET MTP Solution," Brochure, Date Unknown, 11 pages, http://www.infinique.com/upload/13182286190.pdf.
"Hubbell OptiChannel High Density 144 Port 1U Fiber Enclosure," Brochure, Date Unknown, 2 pages, http://www.hubbell-premise.com/literature/PLDF010.pdf.
Non-final Office Action for U.S. Appl. No. 12/771,473 mailed Oct. 4, 2012, 6 pages.
Non-final Office Action for U.S. Appl. No. 12/819,081 mailed Aug. 21, 2012, 12 pages.
International Search Report for PCT/US2010/038986 mailed Aug. 18, 2010, 1 page.
Notice of Allowance for U.S. Appl. No. 12/417,325 mailed Aug. 22, 2012, 7 pages.
Notice of Panel Decision for Pre-Appeal Brief for U.S. Appl. No. 12/417,325 mailed Aug. 8, 2012, 2 pages.
Advisory Action for U.S. Appl. No. 12/417,325 mailed Jun. 29, 2012, 3 pages.
Advisory Action for U.S. Appl. No. 12/417,325 mailed Jun. 12, 2012, 3 pages.
Final Office Action for U.S. Appl. No. 12/417,325 mailed Apr. 16, 2012, 6 pages.
Final Office Action for U.S. Appl. No. 12/417,325 mailed Feb. 7, 2012, 7 pages.
Non-final Office Action for U.S. Appl. No. 12/417,325 mailed Jun. 15, 2011, 6 pages.
Notice of Allowance for U.S. Appl. No. 12/487,929 mailed Sep. 12, 2012, 4 pages.
Notice of Allowance for U.S. Appl. No. 12/487,929 mailed Jun. 13, 2012, 8 pages.
Advisory Action for U.S. Appl. No. 12/487,929 mailed Apr. 17, 2012, 3 pages.
Final Office Action for U.S. Appl. No. 12/487,929 mailed Feb. 14, 2012, 6 pages.
Final Office Action for U.S. Appl. No. 12/487,929 mailed Dec. 5, 2011, 7 pages.
Non-final Office Action for U.S. Appl. No. 12/487,929 mailed May 23, 2011, 7 pages.
Notice of Allowance for U.S. Appl. No. 12/415,253 mailed Mar. 11, 2011, 7 pages.
Non-final Office Action for U.S. Appl. No. 12/415,253 mailed Jul. 12, 2010, 11 pages.
Final Office Action for U.S. Appl. No. 12/415,253 mailed Apr. 16, 2010, 9 pages.
Non-final Office Action for U.S. Appl. No. 12/415,253 mailed Sep. 30, 2009, 8 pages.
Non-final Office Action for U.S. Appl. No. 12/641,617 mailed Oct. 5, 2012, 21 pages.
Final Office Action for U.S. Appl. No. 12/630,938 mailed Jun. 1, 2012, 18 pages.
Non-final Office Action for U.S. Appl. No. 12/630,938 mailed Dec. 19, 2011, 15 pages.
Non-final Office Action for U.S. Appl. No. 12/751,884 mailed Jul. 2, 2012, 9 pages.
Non-final Office Action for U.S. Appl. No. 12/871,052 mailed Aug. 13, 2012, 8 pages.
International Search Report for PCT/US2010/023901 mailed Jun. 11, 2010, 3 pages.
Notice of Allowance for U.S. Appl. No. 12/576,769 mailed May 31, 2012, 9 pages.
Non-final Office Action for U.S. Appl. No. 12/956,475 mailed Oct. 4, 2012, 7 pages.
Non-final Office Action for U.S. Appl. No. 13/302,067 mailed Jun. 7, 2013, 13 pages.
Final Office Action for U.S. Appl. No. 12/771,473 mailed Jul. 19, 2013, 7 pages.
Notice of Allowance for U.S. Appl. No. 12/751,884 mailed Jul. 17, 2013, 8 pages.
Non-final Office Action for U.S. Appl. No. 12/940,585 mailed Aug. 16, 2013, 14 pages.
Final Office Action for U.S. Appl. No. 12/953,134 mailed Aug. 23, 2013, 11 pages.
*Ex parte Quayle* Action for U.S. Appl. No. 12/953,164 mailed Aug. 16, 2013, 5 pages.
Non-final Office Action for U.S. Appl. No. 12/732,487 mailed Jul. 17, 2013, 22 pages.
Non-final Office Action and Interview Summary for U.S. Appl. No. 12/707,889 mailed Aug. 8, 2013, 15 pages.
Advisory Action for U.S. Appl. No. 12/953,039 mailed Jul. 12, 2013, 3 pages.
Advisory Action for U.S. Appl. No. 12/953,118 mailed Jul. 12, 2013, 3 pages.
Advisory Action for U.S. Appl. No. 12/641,617 mailed Jul. 29, 2013, 3 pages.
Annex to Form PCT/ISA/2006, Communication Relating to the Results of the Partial International Search, for PCT/US2009/004549 mailed Feb. 10, 2010, 2 pages.
Annex to Form PCT/ISA/206, Communication Relating to the Results of the Partial International Search, for PCT/US2009/004548 mailed Jan. 19, 2010, 2 pages.
Corning Cable Systems, "Corning Cable Systems Products for BellSouth High Density Shelves," Jun. 2000, 2 pages.
Corning Cable Systems, "Corning Cable Systems Quick Reference Guide for Verizon FTTP FDH Products," Jun. 2005, 4 pages.
Conner, M. "Passive Optical Design for RFOG and Beyond," Braodband Properties, Apr. 2009, pp. 78-81.
Corning Evolant, "Eclipse Hardware Family," Nov. 2009, 1 page.
Corning Evolant, "Enhanced Management Frame," Dec. 2009, 1 page.
Corning Evolant, "Enhanced Management Frame (EMF)," Specification Sheet, Nov. 2009, 24 pages.
Corning Cable Systems, "Evolant Solutions for Evolving Networks: Fiber Optic Hardware," Oct. 2002, 2 pages.
Corning Cable Systems, "Fiber Optic Hardware with Factory-Installed Pigtails: Features and Benefits," Nov. 2010, 12 pages.
Corning Cable Systems, "FiberManager System 1- and 3-Position Compact Shelves," Jan. 2003, 4 pages.
Corning Cable Systems, "FiberManager System Frame and Components," Jan. 2003, 12 pages.
Corning Cable Systems, "High Density Frame," Jul. 2001, 2 pages.
Corning Cable Systems, "High Density Frame (HDF) Connector-Splice Shelves and Housings," May 2003, 4 pages.
International Search Report for PCT/US10/35529 mailed Jul. 23, 2010, 2 pages.
International Search Report for PCT/US10/35563 mailed Jul. 23, 2012, 1 page.
International Search Report for PCT/US2008/002514 mailed Aug. 8, 2008, 2 pages.

(56) References Cited

OTHER PUBLICATIONS

International Search Report for PCT/US2008/010317 mailed Mar. 4, 2008, 2 pages.
International Search Report for PCT/US2009/001692 mailed Nov. 24, 2009, 5 pages.
International Search Report for PCT/US2010/024888 mailed Jun. 23, 2010, 5 pages.
International Search Report for PCT/US2010/027402 mailed Jun. 16, 2010, 2 pages.
Corning Cable Systems, "MTX Frames and Accessories," Feb. 2006, 4 pages.
Panduit, "Lock-in LC Duplex Clip," Accessed Mar. 22, 2012, 1 page.
International Search Report for PCT/US06/49351 mailed Apr. 25, 2008, 1 page.
International Search Report for PCT/US09/57069 mailed Mar. 24, 2010, 2 pages.
International Search Report for PCT/US2009/057244 mailed Nov. 9, 2009 3 pages.
International Search Report for PCTUS2009004548 mailed Mar. 19, 2010, 5 pages.
International Search Report for PCTUS2009004549 mailed Apr. 20, 2010, 6 pages.
Siecor, "Single Shelf HDF with Slack Storage and Heat Shield (HH1-CSH-1238-1V-BS)," Jan. 1998, 12 pages.
Corning Cable Systems, "Mass Termination Xchange (MTX) Frame System Equipment Office Planning and Application Guide," SRP003-664, Issue 1, Mar. 2005, 57 pages.
Corning Cable Systems, "Mass Termination Xchange (MTX) Equipment Patch Cord Interbay Vertical Channel," SRP003-684, Issue 1, Mar. 2005, 8 pages.
Corning Cable Systems, "High Density Frame (HDF) Installation," SRP003-355, Issue 4, Sep. 2002, 18 pages.
Written Opinion for PCT/US2010/023901 mailed Aug. 25, 2011, 8 pages.
Advisory Action for U.S. Appl. No. 12/221,117 mailed Aug. 24, 2011, 3 pages.
Examiner's Answer to Appeal Brief for U.S. Appl. No. 12/221,117 mailed Mar. 29, 2012, 16 pages.
Final Office Action for U.S. Appl. No. 12/221,117 mailed Feb. 19, 2010, 7 pages.
Final Office Action for U.S. Appl. No. 12/221,117 mailed Jun. 10, 2011, 8 pages.
Non-final Office Action for U.S. Appl. No. 12/221,117 mailed Jul. 14, 2010, 7 pages.
Non-final Office Action for U.S. Appl. No. 12/221,117 mailed Jun. 9, 2009, 5 pages.
Non-final Office Action for U.S. Appl. No. 12/221,117 mailed Dec. 21, 2010, 7 pages.
Advisory Action for U.S. Appl. No. 12/394,483 mailed Feb. 16, 2012, 3 pages.
Final Office Action for U.S. Appl. No. 12/394,483 mailed Dec. 6, 2011, 14 pages.
Non-final Office Action for U.S. Appl. No. 12/394,483 mailed Jun. 17, 2011, 11 pages.
Advisory Action for U.S. Appl. No. 12/950,234 mailed Dec. 21, 2011, 3 pages.
Non-final Office Action for U.S. Appl. No. 12/950,234 mailed Jun. 17, 2011, 7 pages.
Non-final Office Action for U.S. Appl. No. 12/950,234 mailed Mar. 12, 2012, 10 pages.
Final Office Action for U.S. Appl. No. 12/950,234 mailed Oct. 14, 2011, 10 pages.
Advisory Action mailed May 12, 2011, for U.S. Appl. No. 12/323,423, 3 pages.
Final Rejection mailed Mar. 3, 2011, for U.S. Appl. No. 12/323,423, 17 pages.
Non-Final Rejection mailed Aug. 5, 2011, for U.S. Appl. No. 12/323,423, 13 pages.
International Search Report for PCT/US2013/041268 mailed Aug. 20, 2013, 5 pages.
Notice of Allowance for U.S. Appl. No. 13/292,130 mailed Feb. 14, 2014, 7 pages.
Final Office Action for U.S. Appl. No. 12/707,889 mailed Feb. 11, 2014, 17 pages.
Non-final Office Action for U.S. Appl. No. 12/940,699 mailed Feb. 3, 2014, 10 pages.
Notice of Allowance for U.S. Appl. No. 12/952,960 mailed Feb. 13, 2014, 7 pages.
Notice of Allowance and Applicant-Initiated Interview Summary for U.S. Appl. No. 12/771,473 mailed Feb. 27, 2014, 8 pages.
Non-final Office Action for U.S. Appl. No. 13/081,856 mailed Nov. 26, 2013, 11 pages.
Non-final Office Action for U.S. Appl. No. 13/688,675 mailed Jan. 31, 2014, 13 pages.
Non-final Office Action for U.S. Appl. No. 13/663,975 mailed Jan. 31, 2014, 18 pages.
Non-final Office Action for U.S. Appl. No. 12/394,114 mailed Mar. 21, 2014, 9 pages.
Final Office Action for U.S. Appl. No. 12/940,585 mailed Mar. 18, 2014, 15 pages.
Non-final Office Action for U.S. Appl. No. 12/953,101 mailed Apr. 3, 2014, 9 pages.
Advisory Action for U.S. Appl. No. 12/956,446 mailed Mar. 20, 2014, 3 pages.
Final Office Action for U.S. Appl. No. 13/603,894 mailed Mar. 20, 2014, 15 pages.
Advisory Action for U.S. Appl. No. 12/953,039 mailed Mar. 6, 2014, 3 pages.
International Search Report for PCT/US2012/023622 mailed Mar. 9, 2012, 4 pages.
International Search Report for PCT/US2012/023635 mailed Sep. 14, 2012, 3 pages.
International Search Report for PCT/US2012/023626 mailed May 22, 2012, 4 pages.
Notice of Allowance for U.S. Appl. No. 13/951,916 mailed Dec. 16, 2013, 12 pages.
International Preliminary Report on Patentability for PCT/US2012/052958 mailed Mar. 13, 2014, 14 pages.
Non-final Office Action for U.S. Appl. No. 12/947,883 mailed Sep. 6, 2013, 9 pages.
Final Office Action for U.S. Appl. 12/947,883 mailed Mar. 31, 2014, 13 pages.
International Search Report and Written Opinion for PCT/US2011/035683 mailed Sep. 8, 2011, 15 pages.
International Search Report and Written Opinion for PCT/US2010/039218 mailed Oct. 27, 2010, 13 pages.
International Search Report and Written Opinion for PCT/US2011/035684 mailed Jul. 1, 2011, 11 pages.
International Search Report and Written Opinion for PCT/US11/61754 mailed Mar. 26, 2012, 9 pages.
First Office Action for Chinese patent application 201080032453.2 issued Mar. 26, 2013, 6 pages.
Chinese Search Report for Chinese patent application 201080032453.2 mailed May 15, 2013, 2 pages.
First Office Action for Chinese patent application 201080031621.6 mailed Sep. 26, 2013, 9 pages.
Chinese Search Report for Chinese patent application 201080031621.6 mailed Sep. 13, 2013, 2 pages.
Ramdas, "Modern File Systems and Storage," Proceedings of the 2nd International SANE Conference, May 22-25, 2000, MECC, Maastricht, The Netherlands, Copyright Rodney R. Ramdas, 10 pages.
Author Unknown, "144 Fiber Patch Panel 1U," Technical Data, ADTEK Group Limited, 2009, 2 pages.
Non-final Office Action for U.S. Appl. No. 13/603,894 mailed Oct. 3, 2013, 9 pages.
Advisory Action for U.S. Appl. No. 12/394,114 mailed Jan. 2, 2014, 3 pages.
Notice of Allowance for U.S. Appl. No. 12/871,052 mailed Dec. 24, 2013, 9 pages.
Final Office Action for U.S. Appl. No. 12/953,039 mailed Dec. 27, 2013, 10 pages.

(56) References Cited

OTHER PUBLICATIONS

Advisory Action for U.S. Appl. No. 12/952,960 mailed Jan. 8, 2014, 3 pages.
Advisory Action for U.S. Appl. No. 12/952,912 mailed Nov. 26, 2013, 3 pages.
Examiner's Answer to the Appeal Brief for U.S. Appl. No. 12/953,118 mailed Dec. 3, 2013, 6 pages.
Non-final Office Action for U.S. Appl. No. 13/597,549 mailed Jan. 14, 2014, 9 pages.
Final Office Action for U.S. Appl. No. 12/732,487 mailed Dec. 6, 2013, 24 pages.
Final Office Action for U.S. Appl. No. 12/956,446 mailed Dec. 23, 2013, 12 pages.
Non-final Office Action for U.S. Appl. No. 12/819,065 mailed Dec. 3, 2013, 8 pages.
International Search Report and Written Opinion for PCT/US2011/062353 mailed Apr. 10, 2012, 15 pages.
Final Office Action for U.S. Appl. No. 12/952,912 mailed Aug. 30, 2013, 15 pages.
Advisory Action for U.S. Appl. No. 12/771,473 mailed Oct. 2, 2013, 3 pages.
Notice of Allowance for U.S. Appl. No. 12/641,617 mailed Sep. 4, 2013, 9 pages.
Notice of Allowance for U.S. Appl. No. 12/871,052 mailed Sep. 18, 2013, 9 pages.
Non-final Office Action for U.S. Appl. No. 12/953,039 mailed Sep. 12, 2013, 8 pages.
Non-final Office Action for U.S. Appl. No. 12/946,139 mailed Oct. 2, 2013, 18 pages.
Final Office Action for U.S. Appl. No. 12/394,114 mailed Oct. 4, 2013, 10 pages.
Non-final Office Action for U.S. Appl. No. 12/818,986 mailed Oct. 4, 2013, 19 pages.
Advisory Action for U.S. Appl. No. 12/953,134 mailed Nov. 4, 2013, 3 pages.
Final Office Action for U.S. Appl. No. 12/952,960 mailed Oct. 29, 2013, 8 pages.
Notice of Allowance for U.S. Appl. No. 13/292,130 mailed Oct. 18, 2013, 9 pages.
Non-final Office Action for U.S. Appl. No. 13/901,074 mailed Oct. 9, 2013, 6 pages.
Non-final Office Action for U.S. Appl. No. 12/956,446 mailed Sep. 6, 2013, 10 pages.
Final Office Action for U.S. Appl. No. 12/946,217 mailed Apr. 25, 2014, 40 pages.
Non-final Office Action for U.S. Appl. No. 13/833,876 mailed Apr. 24, 2014, 7 pages.
Decision on Appeal for U.S. Appl. No. 12/221,117 mailed Jul. 1, 2014, 7 pages.
Advisory Action for U.S. Appl. No. 12/707,889 mailed Jun. 11, 2014, 4 pages.
Advisory Action for U.S. Appl. No. 12/940,585 mailed Jun. 17, 2014, 3 pages.
Advisory Action for U.S. Appl. No. 12/947,883 mailed Jun. 19, 2014, 3 pages.
Non-final Office Action for U.S. Appl. No. 12/732,487 mailed Jun. 20, 2014, 24 pages.
Non-final Office Action for U.S. Appl. No. 13/621,958 mailed Jun. 20, 2014, 13 pages.
Final Office Action for U.S. Appl. No. 13/649,417 mailed Jun. 25, 2014, 9 pages.
Non-final Office Action for U.S. Appl. No. 12/952,960 mailed Jun. 26, 2014, 13 pages.
Non-final Office Action for U.S. Appl. No. 13/746,938 mailed Jul. 11, 2014, 9 pages.
Non-final Office Action for U.S. Appl. No. 12/751,895 mailed May 20, 2014, 9 pages.
Notice of Allowance for U.S. Appl. No. 13/533,093 mailed Jul. 8, 2014, 9 pages.
Notice of Allowance for U.S. Appl. No. 13/597,549 mailed Jul. 8, 2014, 8 pages.
Notice of Allowance for U.S. Appl. No. 13/455,646 mailed Jun. 2, 2014, 9 pages.
Notice of Allowance for U.S. Appl. No. 12/221,117 mailed Jul. 16, 2014, 7 pages.
Non-final Office Action for U.S. Appl. No. 12/819,065 mailed Jul. 18, 2014, 10 pages.
Final Office Action for U.S. Appl. No. 12/818,986 mailed Jul. 18, 2014, 27 pages.
Final Office Action for U.S. Appl. No. 13/081,856 mailed Jul. 2, 2014, 8 pages.
Non-final Office Action for U.S. Appl. No. 12/946,217 mailed Jul. 26, 2012, 25 pages.
Final Office Action for U.S. Appl. No. 12/946,217 mailed Mar. 18, 2013, 48 pages.
Non-final Office Action for U.S. Appl. No. 12/946,217 mailed Oct. 3, 2013, 47 pages.

\* cited by examiner

ROTATABLE ROUTING GUIDE AND ASSEMBLY

CROSS-REFERENCE TO RELATED APPLICATIONS

The present application claims priority to U.S. Provisional Patent Application Ser. No. 61/329,898, filed Apr. 30, 2010, entitled "Rotatable Routing Guide Assembly," the disclosure of which is relied upon and incorporated herein by reference in its entirety.

This application is related to co-pending U.S. patent application Ser. No. 12/940,585, filed Nov. 5, 2010, entitled "Fiber Optic Housings Configured To Accommodate Fiber Optic Modules/Cassettes and Fiber Optic Panels, And Related Components and Methods" the disclosure of which is relied upon and incorporated herein by reference in its entirety.

This application is related to co-pending U.S. patent application Ser. No. 12/940,699, filed Nov. 5, 2010, entitled "Stackable Shelves For A Fiber Optic Housing, and Related Components and Methods," the disclosure of which is relied upon and incorporated herein by reference in its entirety.

BACKGROUND

1. Field of the Disclosure

The disclosure relates to fiber optic components and more particularly to a fiber optic routing guide removably attachable to fiber optic equipment. The routing guide attaches to the equipment via an attachment feature, such that the routing guide is rotatably, selectably positionable at a plurality of points through a 360 degree angular displacement to accommodate multiple turns, locations and volumes of optical fiber installed in the equipment.

2. Technical Background

Benefits of optical fiber include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point. In this regard, fiber optic equipment is located in data distribution centers or central offices to support interconnections.

The fiber optic equipment is customized based on the application need and is typically included in housings designed to support the fiber optic equipment, which are mounted in equipment racks to optimize use of space. Fiber optic equipment is designed to provide connection or termination points for optical fiber. As such, optic fiber may be routed to and in the fiber optic equipment. Typically, fiber optic routing guides are utilized to manage and direct the routing of optical fiber in the fiber optic equipment. However, the fiber optic equipment is being designed to handle increased connection density resulting in the increase in the amount of optical fiber routed in the fiber optic equipment.

SUMMARY

Embodiments disclosed in the detailed description include a rotatable routing guide comprising a guide portion configured to accept fiber optic cable and an attachment feature for removably attaching the guide portion to a mounting surface. The routing guide is rotatable through a 360 degree angular displacement and is rotatably, selectably positionable at a plurality of points throughout the 360 degree angular displacement when removably attached to the mounting surface. The attachment feature has at least one tab and forms a notch with the tab, wherein the notch is configured to receive a portion of the mounting surface. The at least one tab is resilient such that the portion of the mounting surface received in the notch is friction fit between the guide portion and the tab with the tab biasing the portion of the mounting surface against the guide portion. The biasing allows for the positioning of the rotatable routing guide in the selected multiple positions while maintaining the friction fit. A keyed receiver is formed in the mounting surface. The keyed receiver has a lip extending partially around an interior edge of the keyed receiver. The lip being the portion of the mounting surface received in the notch and friction fit between the tab and the guide portion.

The attachment feature may have a first tab and a second tab, with the first tab forming a first notch between the first tab guide portion, and the second tab forming a second notch between the second tab and the guide portion. The mounting surface has a keyed receiver with a first tab slot and a second tab slot for receiving the attachment feature in one orientation. The first tab is configured to be received by the first tab slot in the mounting surface and the second tab is configured to be received by the second tab slot in the mounting surface. The first tab is resilient such that a portion of the mounting surface is received in a notch formed between the first tab and the guide portion, the portion of the mounting surface is friction fit between the guide portion and the first tab with the first tab biasing the portion of the mounting surface against the guide portion. The biasing allows for the positioning of the rotatable routing guide in the selected multiple positions while maintaining the friction fit.

The guide portion may have a plurality of routing segments. The guide portion has a top, a bottom, a first wall and a second wall, wherein the first wall and the second wall attach to and extend from the bottom. At least one of the first wall and the second wall is deformable. The guide portion has a third wall between the first wall and the second wall. One end of the third wall is attached to and extends from the bottom, and another end of the third wall is attached to and extends from a center portion of the top. The first wall is attached to a first portion of the top, and the second wall is attached to a second portion of the top. A first gap is formed between the first portion of the top and the center portion, and a second gap is formed between the second portion of the top and the center portion. The first gap and the second gap may be used by the rotatable routing guide to receive optical fibers in the different segments of the guide portion. A force due to the attachment feature applying a bias to the guide portion when the rotatable routing guide is removably attached to the mounting surface, deforms the first wall closing the first gap, and deforms the second wall closing the second gap.

A further embodiments disclosed in the detailed description include a rotatable routing guide comprising a guide portion configured to accept fiber optic cable and an attachment feature for removably attaching the guide portion to a mounting surface. The routing guide is rotatable through a 360 degree angular displacement and is rotatably, selectably positionable at a plurality of points throughout the 360 degree angular displacement when removably attached to the mounting surface. The attachment feature has a tab having a protrusion. The mounting surface comprises a plurality of detents, and wherein when the rotatable routing guide rotates, the protrusion positions in one of the plurality of detents releasably locking the rotatable routing guide at a position corresponding to the detent.

A further embodiment includes a rotatable routing guide assembly comprising a guide portion an attachment feature and a keyed receiver. The guide portion is configured to receive fiber optic cable. The attachment feature removably attaches the guide portion to a mounting surface and comprises at least one tab connected to the guide portion and forming a notch with the guide portion. The keyed receiver is formed in the mounting surface and has a lip extending partially around an interior edge. The lip is received in the notch and friction fit between the tab and the guide portion. The routing guide is rotatably, selectably positionable when the guide portion is removably attached to the mounting surface.

The keyed receiver is configured to receive the at least one tab in only one orientation. The at least one tab may comprise a first tab and a second tab, with the first tab forming a first notch with the guide portion, and the second tab forming a second notch with the guide portion. The first tab and the second tab may be different sizes. The keyed receiver has a first slot and a second slot. The first slot is sized to receive the first tab and the second slot is sized to receive the second tab, in this way the keyed receiver is configured to receive the first tab and the second tab in only one orientation.

The mounting surface is a portion of fiber optic equipment. The portion of the fiber optic equipment may be a shelf mounted to a chassis in a fiber optic equipment rack. The guide portion has a plurality of segments, and configured to receive fiber optic cables of different sizes by different ones of the plurality of segments.

A further embodiment includes a rotatable routing guide assembly for fiber optic cables routed in a fiber optic equipment shelf. The assembly comprises a guide portion, an attachment feature and a keyed receiver. The guide portion has a bottom, a top, a deformable first wall, a deformable second wall and a third wall forming a plurality of segments, and is configured to receive fiber optic cables of different sizes by different ones of the plurality of segments. The attachment feature removably attaches the guide portion to the shelf. The attachment feature has a first tab forming a first notch with the guide portion, and a second tab forming a second notch with the guide portion. The keyed receiver is formed in the shelf and has a lip extending partially around an interior edge. The lip is received in at least one of the first notch and the second notch and friction fit between at least one of the first tab and the second tab and the guide portion.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
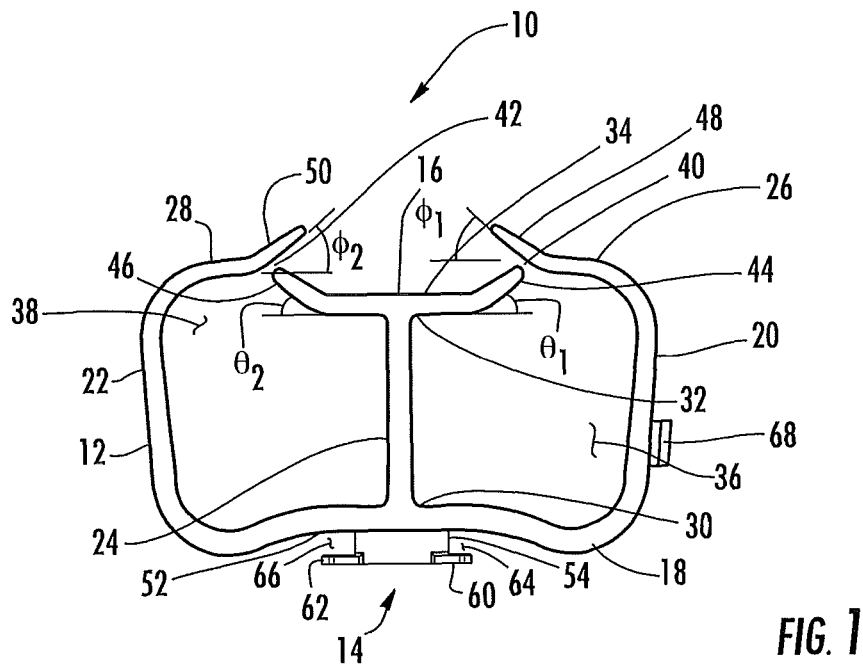
FIG. 1 is a front, elevation view of an exemplary embodiment of a rotatable routing guide.

Reference will now be made in detail to the present preferred embodiment(s), examples of which are illustrated in the accompanying drawings. Whenever possible, the same reference numerals will be used throughout the drawings to refer to the same or like parts.

As used herein, the terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive optical fiber is ClearCurve® Multimode fiber commercially available from Corning Incorporated.

The designation "U" refers to a standard equipment shelf size of a fiber optic equipment rack or a cabinet. This may also be referred to as "RU." For example, an equipment rack may support 42 1U-sized shelves, with "U" equal to a standard 1.75 inches in height and nineteen (19) inches in width. In certain applications, the width of "U" may be twenty-three (23) inches. Typically, the more rack space (the more "U's") a housing takes up, the higher the fiber capacity in the housing. It is often desirable from either a manufacturing standpoint or an installation standpoint to have the ability to conveniently convert from a 1U housing to a 2U housing.

Figure 2:
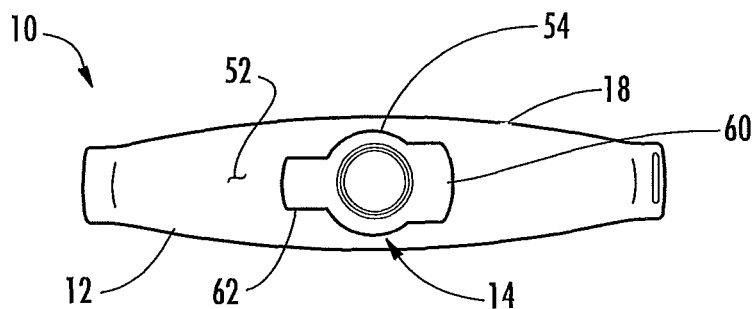
FIG. 2 is a bottom view of the rotatable routing guide of FIG. 1.
Figure 3:
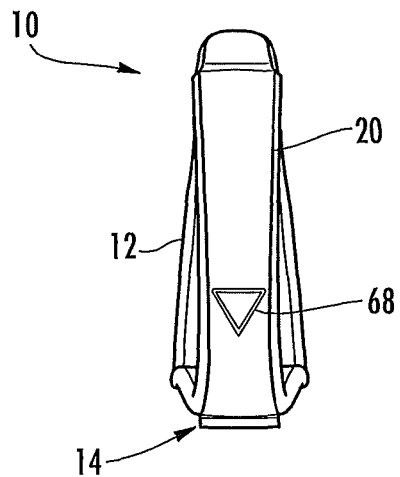
FIG. 3 is a side, elevation view of the rotatable routing guide of FIG. 1.

FIGS. 1-3 illustrate an embodiment of a rotatable routing guide 10 comprising a guide portion 12 configured to accept fiber optic cable (not shown in FIGS. 1-3) and an attachment feature 14 for removably attaching the guide portion 12 to a mounting surface (not shown in FIGS. 1-3). The routing guide may have a plurality of routing segments and be rotatable through 360 degrees and is rotatably, selectably positionable at a plurality of points through a 360 degree angular displacement when removably attached to the mounting surface.

FIG. 1 illustrates a front, elevation view of the rotatable routing guide 10. The guide portion 12 has a top 16, a bottom 18, a first wall 20, a second wall 22, and a third wall 24. The first wall 20 and the second wall 22 attach to and extend from the bottom 18. Either or both of the first wall 20 and the second wall 22 may be deformable. The first wall 20 attaches to a first portion 26 of the top 16. The second wall 22 is attached to a second portion 28 of the top 16. In FIG. 1, the third wall 24 is shown between the first wall 20 and the second wall 22. One end 30 of the third wall 24 is attached to and extends from the bottom 18, while another end 32 of the third wall 24 is attached to and extends from a center portion 34 of the top 16. In this manner, two segments 36, 38 are formed in the guide portion 12 of the rotatable routing guide 10.

Although FIG. 1 shows the routing guide 10 as having two segments, any number of segments, including one, is contemplated by the embodiments described herein. A first gap 40 is formed between the first portion 26 of the top 16 and the center portion 34, and a second gap 42 is formed between the second portion 28 of the top 18 and the center portion 34. The first gap 40 and the second gap 42 may be used by the rotatable routing guide 10 to receive optical fibers in the different segments 36, 38, respectively of the guide portion 12. Additionally, to facilitate the receiving of optical fibers by the rotatable routing guide 10, the center portion 34 of the top 16 may have ends 44, 46 angled upwardly as indicated by $\theta_1$ and $\theta_2$, respectively, in FIG. 1. The angles $\theta_1$ and $\theta_2$ may be the same or different and may range from 0 to 90 degrees. Similarly, one or both of the end 48 of the first portion 26 of the top 16 and the end 50 of the second portion 28 of the top 16 may be angled upwardly as indicated by $\phi_2$ and $\phi_2$, respectively, in FIG. 1. The angles $\phi_2$ and $\phi_2$ may be the same or different and may range from 0 to 90 degrees. The angles $\theta_1$, $\theta_2$, $\phi_1$ and $\phi_2$ may also facilitate the closing of the first gap 40 and the second gap 42 as will be discussed in more detail below. The first wall 20 has a guide mark 68 which may be used by an installer when inserting the rotatable routing guide 10 as discussed in more detail below.

FIG. 2 illustrates a bottom view of the rotatable routing guide 10 with at least one tab forming at least one notch with the guide portion 12 with the notch is configured to receive a portion of the mounting surface. Referring to FIG. 2 in addition to FIG. 1, the attachment feature 14 is shown connected to the underside 52 of the bottom 18. The attachment feature 14 has a base 54 in the form of a cylinder with a channel therethrough. The base 54 extends from the guide portion 12 and acts as a stand-off. Alternatively, one or more stand-offs may be used. A first tab 60 and a second tab 62 connect to and extend from the base 54. In this manner, the first tab 60 forms a first notch 64 between the first tab 60 and the bottom 18 of the guide portion 12. Additionally, the second tab 62 forms a second notch 66 between the second tab 62 and the bottom 18 of the guide portion 12. The first notch 64 and the second notch 66 are configured to receive portions of the mounting surface when the rotatable routing guide 10 is inserted in the keyed receiver. Although in FIGS. 1 and 2 two tabs are illustrated, any number of tabs, including one, may be used and, therefore, it is contemplated by and by the embodiments described herein that the attachment feature 14 have at least one tab forming at least one notch with the guide portion 12. As may be seen better with reference to FIG. 2, the first tab 60 and the second tab 62 may be one or both of a different size and shape. This allows the rotatable routing guide 10 to coordinate with a keyed receiver (not shown) in the mounting surface in one orientation so that the rotatable routing guide 10 may be inserted in the keyed receiver in one orientation.

FIG. 3 illustrates a side elevation of the rotatable routing guide 10 along the first wall 20. The guide mark 68 on the first wall 20 may be used by an installer when inserting the rotatable routing guide 10 in the keyed receiver of the mounting surface. In this way, the guide mark 68 may be aligned with the keyed receiver to provide for the rotatable routing guide 10 to be inserted in the keyed receiver in the correct orientation. The alignment of the guide mark 68 may be with respect to a surface mark (not shown) on the mounting surface. The insertion of the rotatable routing guide 10 in the keyed receiver will be discussed in more detail below.

FIGS. 4-9 illustrate an exemplary embodiment of a rotatable routing guide assembly 100 having a rotatable routing guide 10 with a guide portion 12, an attachment feature 14 and a keyed receiver 72. The guide portion 12 is configured to receive optical fiber. The attachment feature 14 removably attaches the guide portion 12 to a mounting surface and comprises at least one tab connected to the guide portion and forming a notch with the guide portion. The keyed receiver 72 is configured to receive the at least one tab in only one orientation. The keyed receiver 72 is formed in the mounting surface and has a lip extending partially around an interior edge. The lip is received in the notch and friction fit between the tab and the guide portion 12. In this way, the routing guide 12 is rotatable through 360 degrees and is rotatably, selectably positionable within the 360 degree angular displacement when the guide portion is removably attached to the mounting surface. The mounting surface may be a portion of fiber optic equipment, such as a shelf mounted to a chassis in a fiber optic equipment rack. The guide portion 10 has a plurality of segments, and configured to receive fiber optic cables of different sizes by different ones of the plurality of segments.

Figure 4:
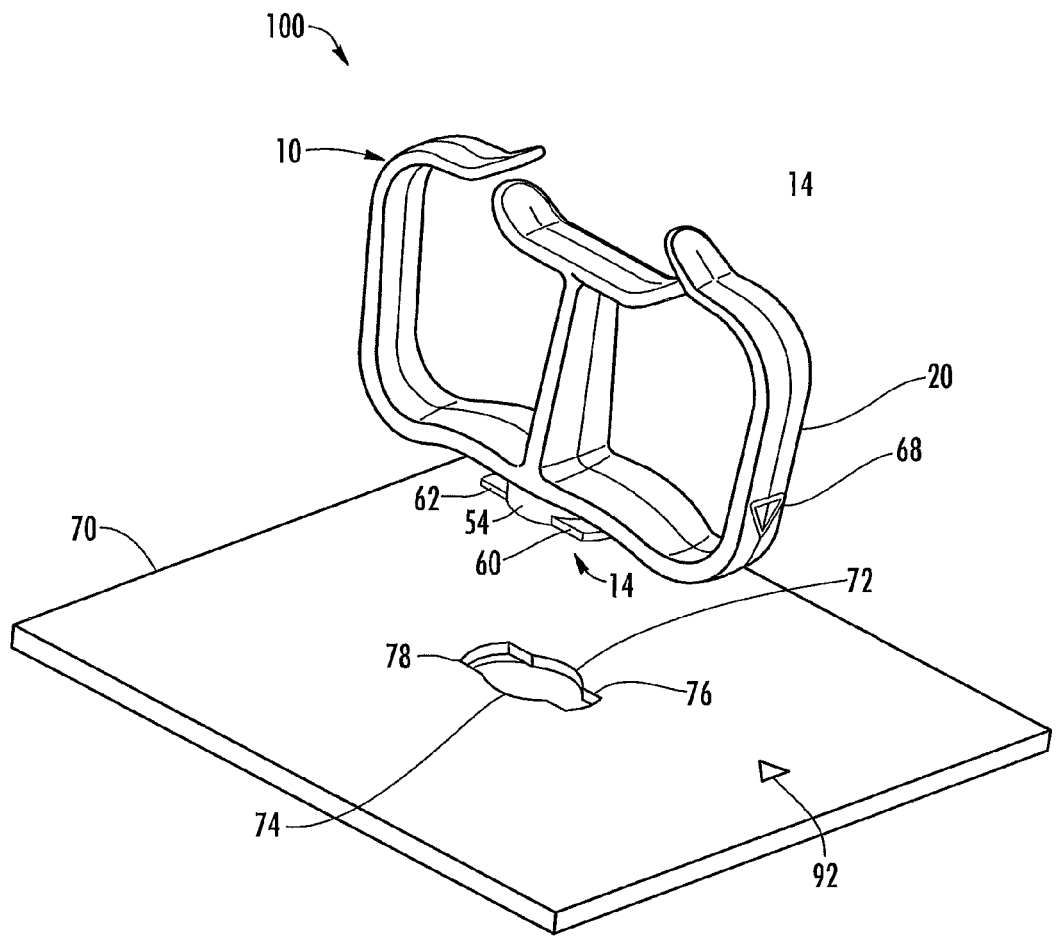
FIG. 4 is a top, perspective, exploded view of an exemplary embodiment of a rotatable routing guide assembly illustrating a rotatable routing guide and a keyed receiver in a mounting surface.

FIG. 4 illustrates the rotatable routing guide assembly 100 comprising the rotatable routing guide 10 and a mounting surface 70. The mounting surface 70, which may be, for example, a shelf of a fiber optic equipment, has a keyed receiver 72 formed therein. The keyed receiver 72 has a base opening 74, a first tab slot 76 and a second tab slot 78. The first tab 60 is configured to be received by the first tab slot 76 in the keyed receiver 72 formed in the mounting surface 70. The second tab 62 is configured to be received by the second tab slot 78 in the keyed receiver 72 formed in the mounting surface 70. In this manner, the guide mark 68 is aligned with a surface mark 92 on the mounting surface 70. In this way, the rotatable routing guide 10 is inserted in the keyed receiver 72 in only one orientation, such that the first tab slot 76 receives the first tab 60, the second tab slot 78 receives the second tab 62 and the base opening 74 receives the base 54.

Figure 5:
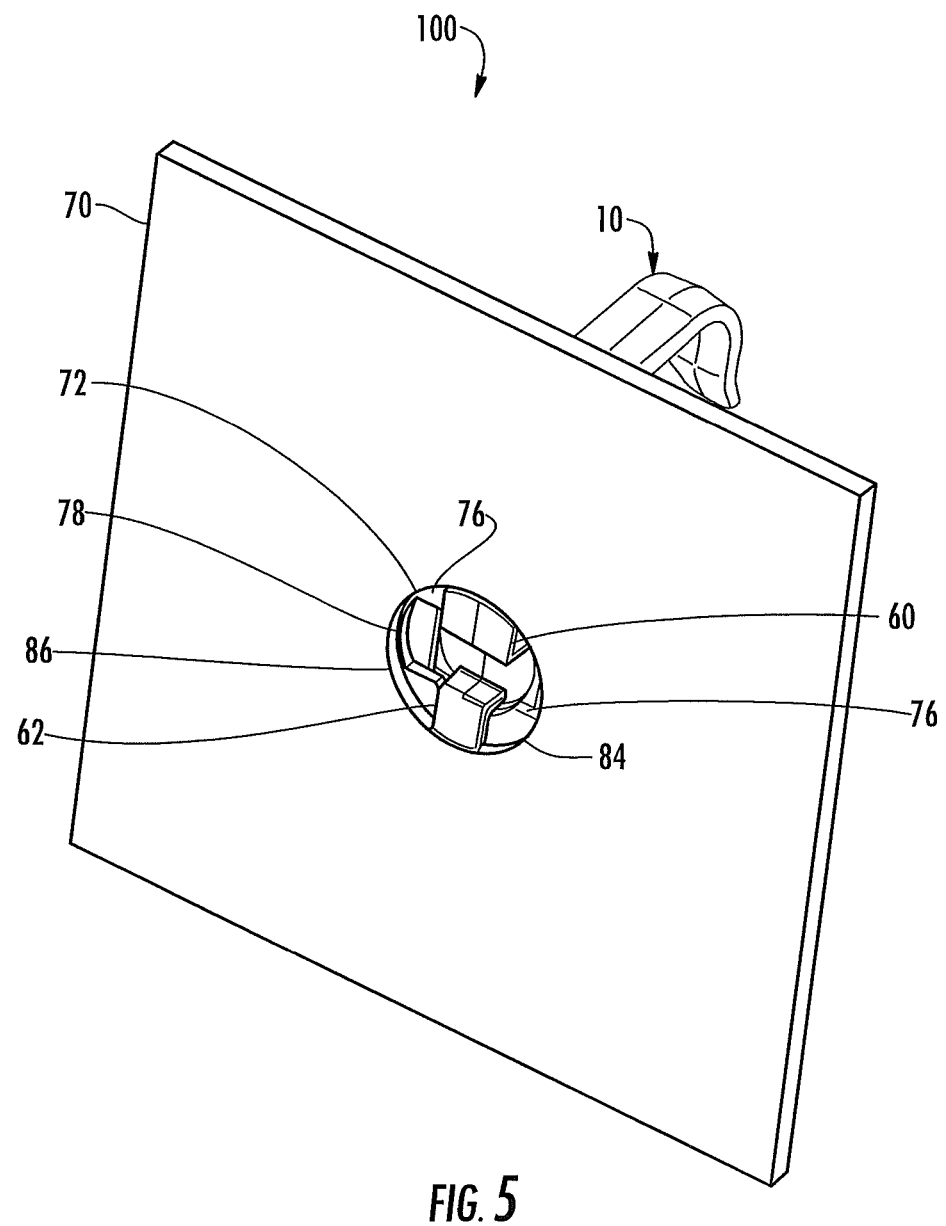
FIG. 5 is a bottom perspective view of the rotatable routing guide assembly of FIG. 4 illustrating the bottom of the mounting surface and keyed receiver with the rotatable routing guide installed therein.

FIG. 5 illustrates the rotatable routing guide assembly 100 from the underside 80 of the mounting surface 70. In FIG. 5, the keyed receiver 72 is shown from the bottom with the first tab 60 having been received by first tab slot 76 and the second tab 62 having been received by the second tab slot 78. The rotatable routing guide 10 is shown as being rotated from the position it would have been in when inserted in the keyed receiver 72. This may be seen in FIG. 5 from the relative position of the first tab 60 with respect to the first tab slot 76, and the relative position of the second tab 62 with respect to the second tab slot 78. The keyed receiver 72 has a lip 82 defined by the base opening 74, first tab slot 76 and the second tab slot 78. The lip 82 extends at least partially around an interior edge 84 of a bottom cut-out 86 of the keyed receiver 72 such that the lip 82 is indented from the underside 80 of the mounting surface 70. In this way, the lip 82 may be the portion of the mounting surface 70 received by the first notch 64 and the second notch 66 formed between the guide portion 12 and the first tab 60 and second tab 62, respectively. Also, the first tab 60 and the second 62 may then be able to travel within the bottom cut-out 86 as the rotatable routing guide 10 rotates and be flush with or not extending beyond the underside 80 of the mounting surface 70.

Figure 6:
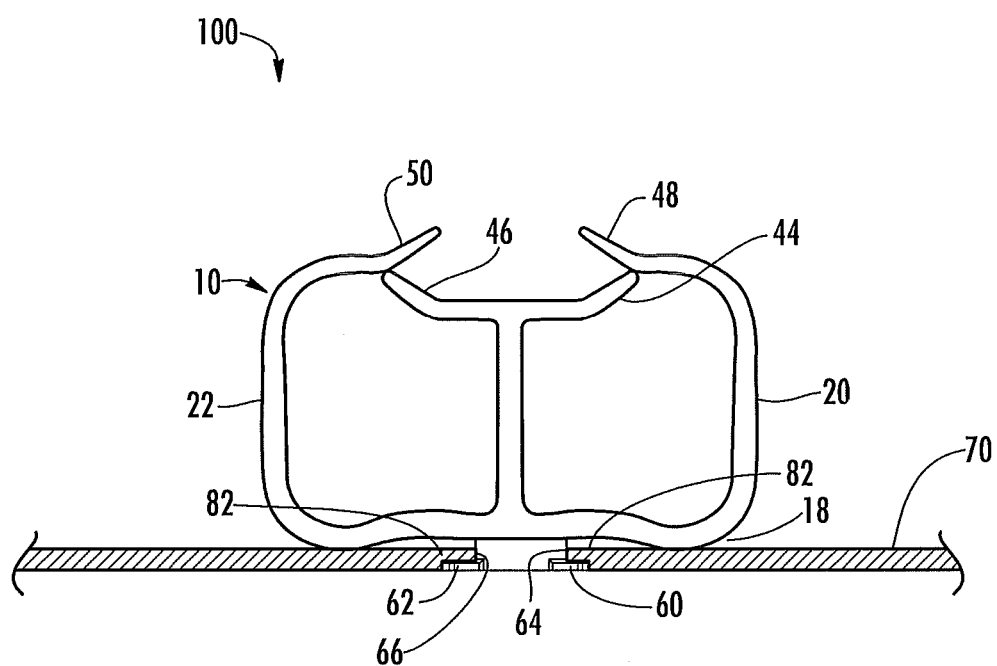
FIG. 6 is a side elevation view of the rotatable routing guide assembly of FIG. 4 with the rotatable routing guide installed in the keyed receiver in the mounting surface.

FIG. 6 is a side elevation view of the rotatable routing guide assembly 100 with the rotatable routing guide 10 installed in the keyed receiver 72 in the mounting surface 70. At least one of the first tab 60 and the second tab 62 is resilient such that the portion of the mounting surface 70, for example the lip 82, received in the first notch 64 and/or the second notch 66 is friction fit between the guide portion 12 and the first tab 60 and/or the second tab 62. Due to the resiliency of the first tab 60 and/or the second tab 62, the first tab 60 and/or the second tab 62 biases the portion of the mounting surface 70, the lip 82, against the bottom 18 of the guide portion 12. The biasing allows for the positioning of the rotatable routing guide 10 in the selected multiple positions while maintaining the friction fit. Additionally, when the first tab 60 and/or the second tab 62 of the attachment feature 14 applies a bias to the guide portion 12, a force results that deforms the first wall 20 closing the first gap 40, and deforms the second wall 22 closing the second gap 42. In FIG. 6, the end 48 of the first portion 26 of the top 16 and the end 50 of the second portion 28 of the top 16 are shown contacting the ends 44, 46, respectively, of the center portion 34 of the top 16. Closing the first gap 40 and the second gap 42 protects against the inadvertent removal of the optical fibers (not shown) from the rotatable routing guide 10.

Figure 7:
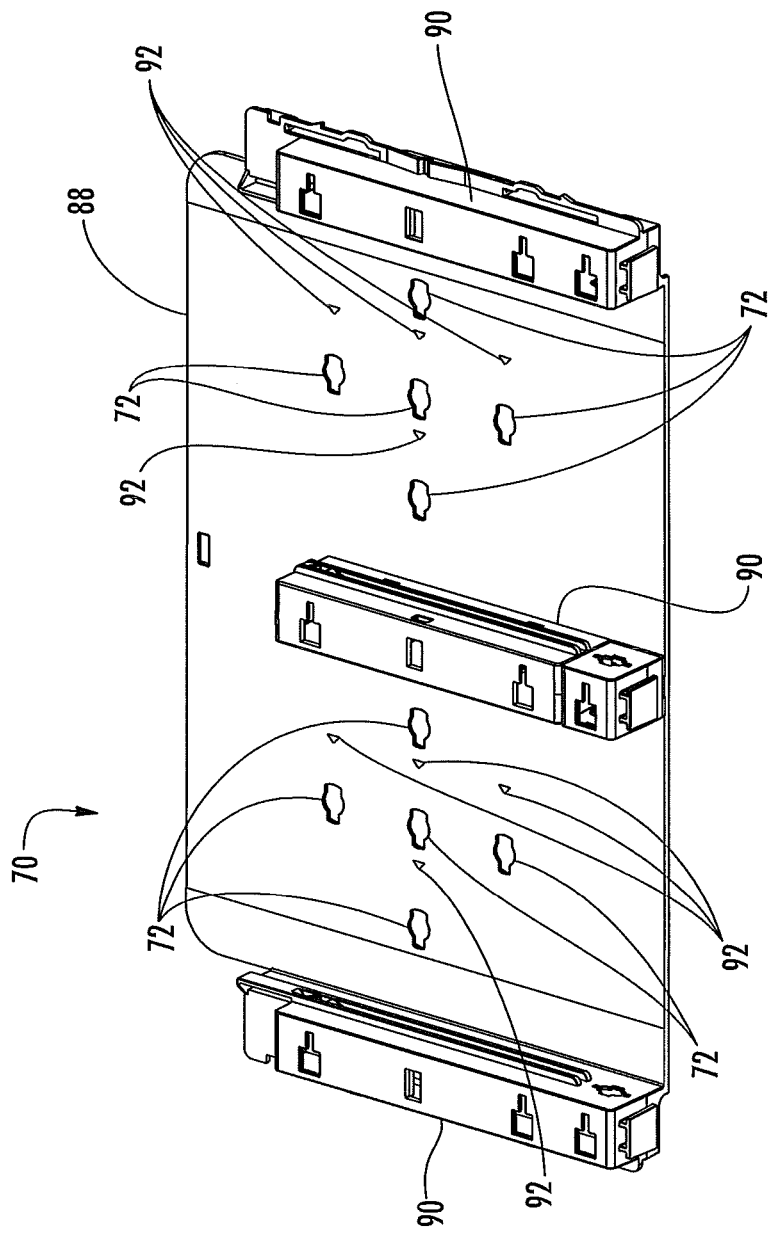
FIG. 7 is a top, perspective view of an exemplary embodiment illustrating multiple keyed receivers of the rotatable routing guide assembly of FIG. 4 in a mounting surface, wherein the mounting surface is a shelf of a fiber optic equipment.

FIG. 7 illustrates a mounting surface 70 in the form of a shelf 88 for a fiber optic equipment. In FIG. 7, the shelf 88 is a type of stackable shelf with stacker assemblies 90 used for stacking fiber optic components (not shown) on the shelf 88. The shelf 88 has an arrangement of multiple keyed receivers 72 formed therein. The arrangement allows for the placement of multiple rotatable routing guides 10 in the shelf 88. The shelf 88 has a surface mark 92 placed with each keyed receiver 72. When an installer intends to insert a rotatable routing guide 10 in the keyed receiver 72, the installer aligns the guide mark 68 on the first wall 20 of the rotatable routing guide 10 with the surface mark 92. In this way, the rotatable routing guide 10 may be inserted in the keyed receiver 72 in the correct orientation.

Figure 8:
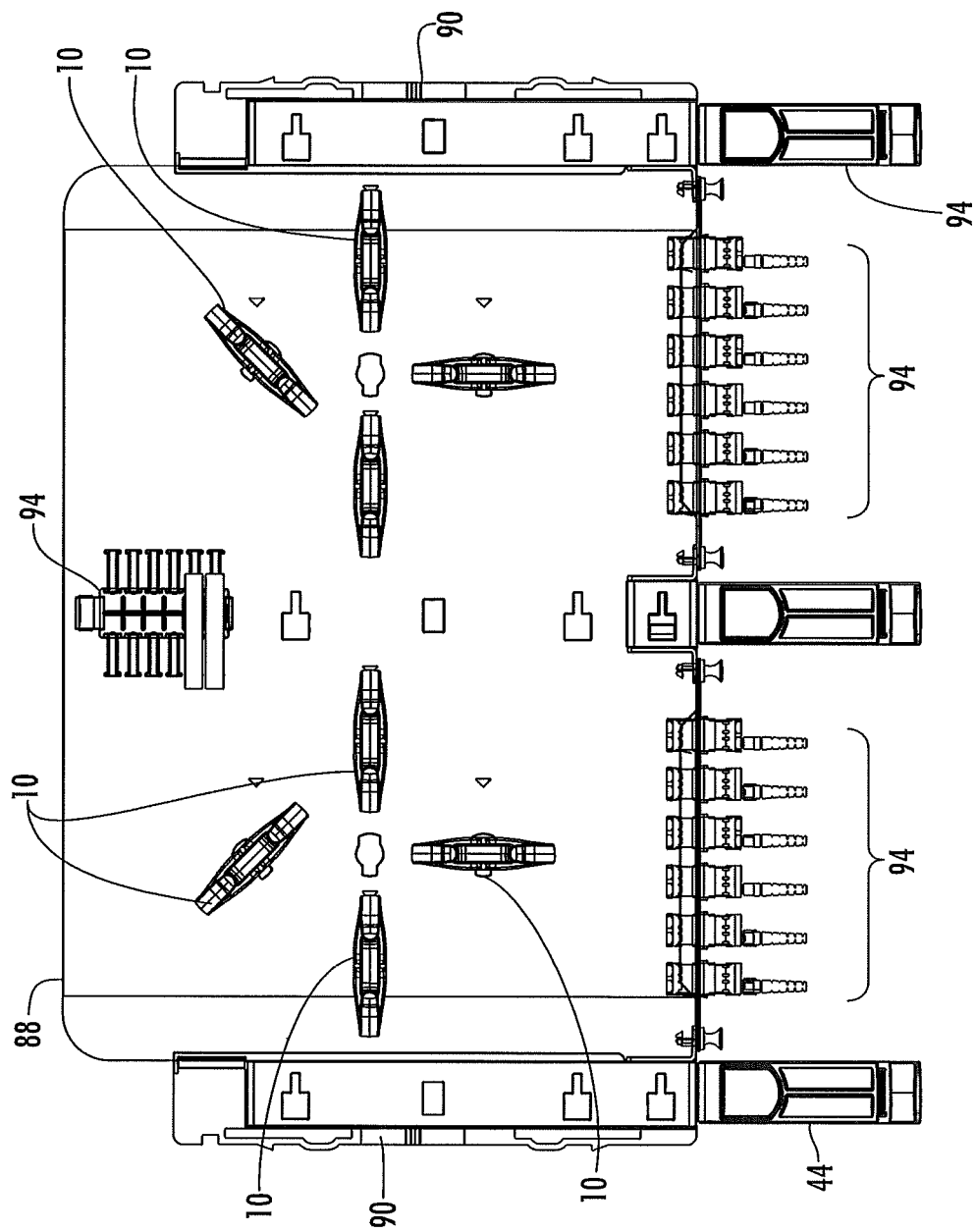
FIG. 8 is a top view of the rotatable routing guide assembly of FIG. 4 in the shelf of a fiber optic equipment of FIG. 7 with other fiber optic components.

FIG. 8 illustrates the shelf 88 with multiple rotatable routing guides 10 inserted in the keyed receivers 72 and other fiber optic components 94. The fiber optic components 94 may be any type of component, as examples, without limitation, adapters, splitters, fan-out devices, slack storage devices, strain relief devices, routing guides, and the like. In FIG. 8, the rotatable routing guides 10 are shown rotated to different angular positions within a 360 degree angular displacement.

Figure 9:
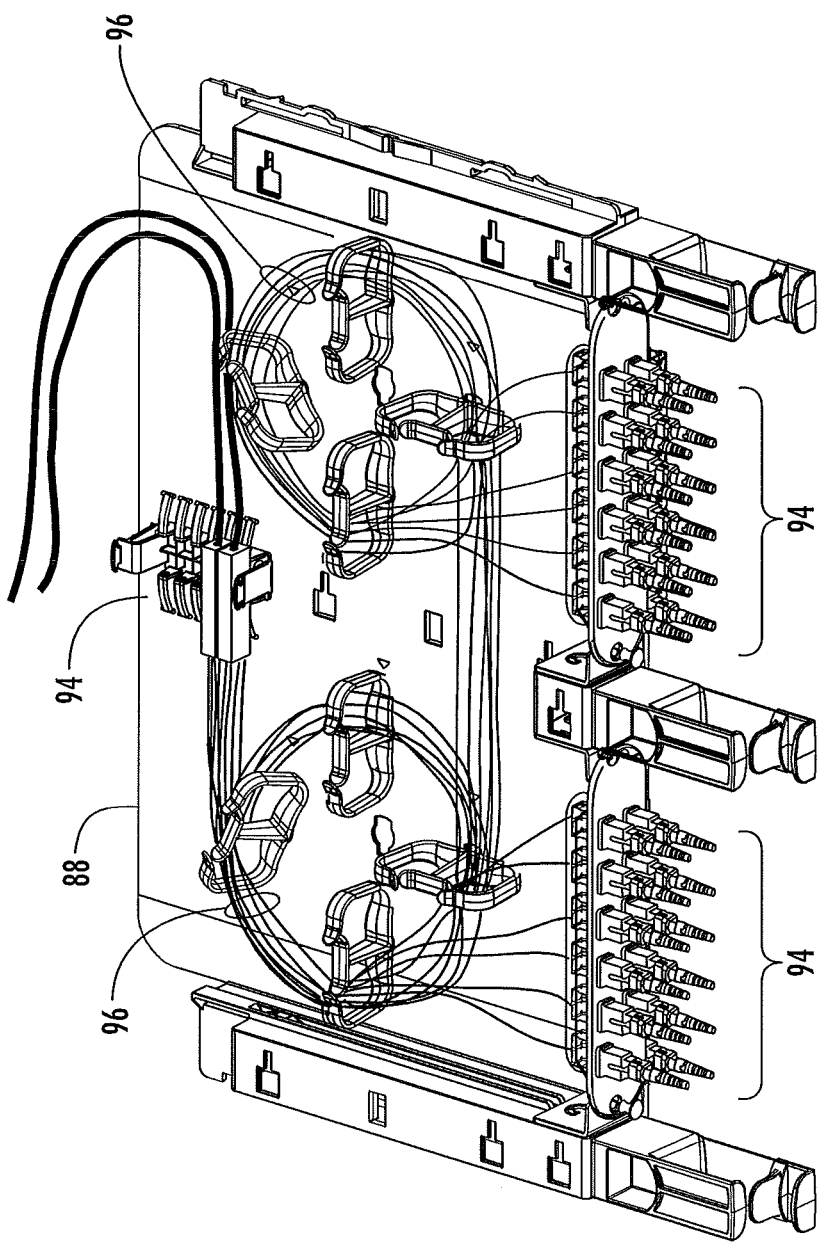
FIG. 9 is a top, perspective view of the rotatable routing guide assembly of FIG. 4 in the shelf of a fiber optic equipment of FIG. 7 with other fiber optic components and optical fibers.

FIG. 9 illustrates the shelf 88 shown in FIG. 8 with optical fibers 96 routed by and through the rotatable routing guides 10 to the different fiber optic components 94. The rotatable routing guides 10 are rotatable through 360 degrees and are rotatably, selectably positionable at a plurality of points through the 360 degree angular displacement to accommodate multiple turns, locations and volumes of optical fiber 96 installed in the shelf 88.

FIGS. 10-13 illustrate an exemplary embodiment of a rotatable routing guide assembly 200 having a rotatable routing guide 110 with a guide portion 112, an attachment feature 114, and a keyed receiver 140. The rotatable routing guide 110 rotatably attaches to a mounting surface 138, such as, for example, a shelf of fiber optic equipment, by inserting the attachment feature 114 in the keyed receiver 140. The attachment feature 114 has a protrusion 136. The keyed receiver 140 has a pattern of detents 144. When the rotatable routing guide 110 is inserted in the keyed receiver 140 and rotated, the protrusion 136 locates in one of the detents 144 and releasably locks the rotatable routing guide 110 at that angular position on the mounting surface 138. The rotatable routing guide 110 may be further rotated with the protrusion 136 locating in another indentation and releasably locking the rotatable routing guide 110 at another angular position.

Figure 10:
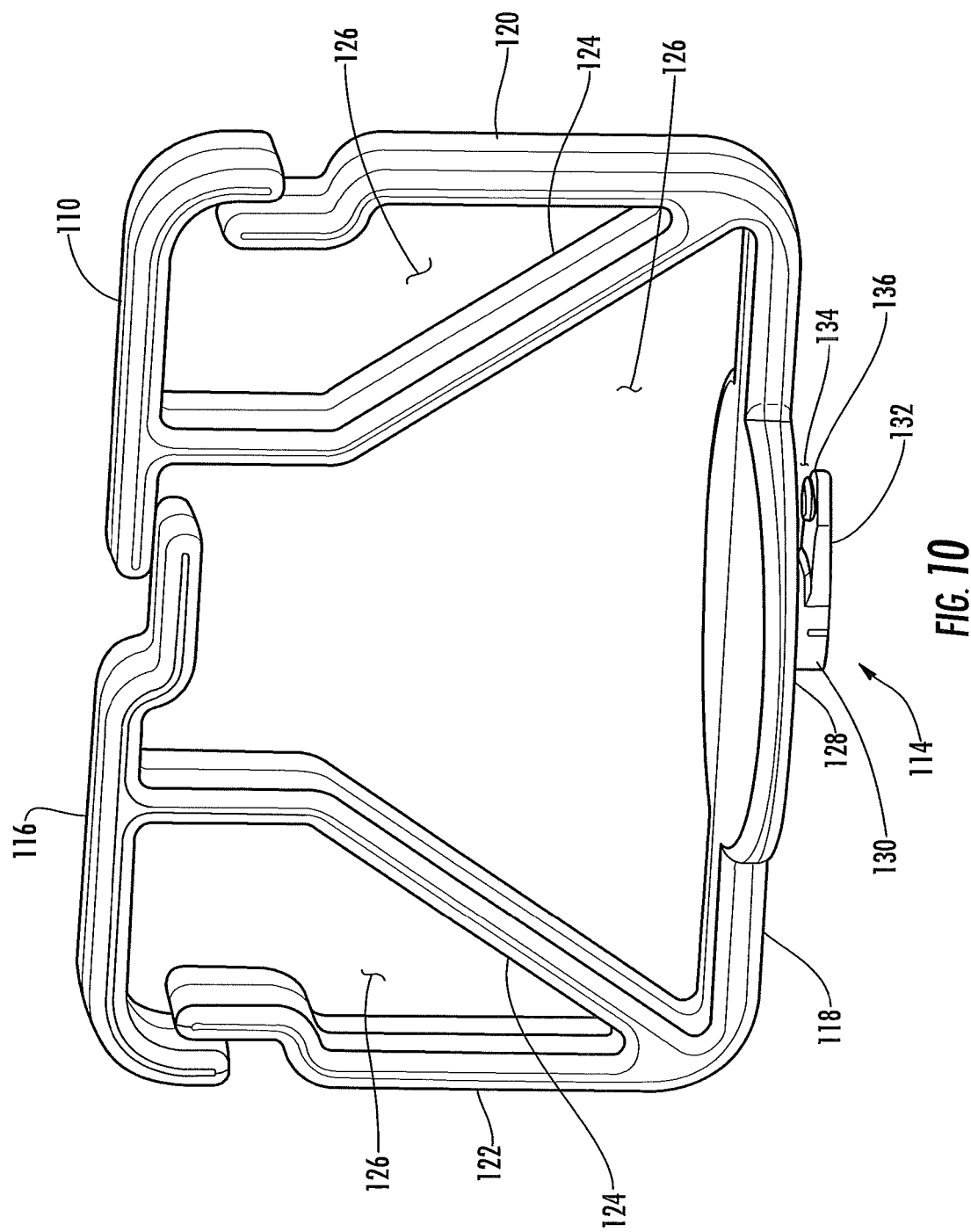
FIG. 10 is a front perspective elevation view of an exemplary embodiment of a rotatable routing guide.

FIG. 10 illustrates a front perspective elevation view of the rotatable routing guide 110. The rotatable routing guide 110 is shown as having a top 116, a bottom 118, a first side wall 120, a second side wall 122, and one or more interior walls 124. The interior wall 124 separates the rotatable routing guide 110 into different segments 126 allowing for the segregation or separation of optical fiber types or bundles. For example, if the user intends to route both buffer tubes and 250 µm fiber, the buffer tubes can be stored in one segment 126, while the 250 µm fiber can be stored in another segment 126. The attachment feature 114 has a base 128 with a stand-off 130 extending from the base 128. A tab 132 connects to and extends from the stand-off 130 forming a notch 134 between the tab 132 and the base 128. A protrusion 136 extends from the tab 132 toward the guide portion 112 in a notch 134 formed between the tab 134 and the guide portion 112. In FIG. 10, the protrusion 136 is shown as having a hemispherical shape, but may be any shape or configuration.

Figure 11:
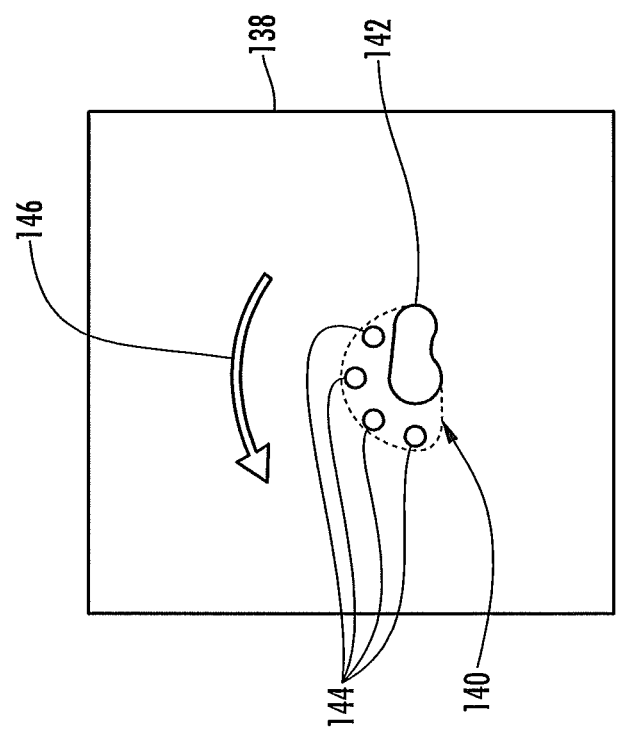
FIG. 11 is a top plan view of a mounting surface with a keyed receiver for receiving the rotatable routing guide of FIG. 10 and forming therewith an exemplary embodiment of a rotatable routing guide assembly.

FIG. 11 illustrates a top plan view of a mounting surface 138 with a keyed receiver 140. The keyed receiver 140 may be formed in the mounting surface 138 or may be a separate component from mounting surface 138. The keyed receiver 140 comprises a slot 142 and one or more detents 144. The detents 144 may be arranged in a circumferentially or partially circumferentially pattern at different angular displacements along the pattern. The detents 144 may be any device to releasably retain the movement of the rotatable routing guide 110, with non-limiting examples of such detents 144 being apertures through the mounting surface 138, indentation in the mounting surface 138, particularly from underside of the mounting surface 138, an obstruction or protrusion, or the like. The slot 142 is shaped to provide a keying feature so that the rotatable routing guide 110 can be received by the keyed receiver 140 in only one orientation. A direction arrow 146 is marked on the mounting surface 138 to indicate the rotational direction of the rotatable routing guide 110 when installed in the keyed receiver 140. The rotation direction indicated by the direction arrow 146 may indicate the direction to rotate the rotatable routing guide 110 to move the rotatable routing guide 110 from an insertion position to one or more position and releasably lock the rotatable routing guide 110 in a position. The hemi-spherically shaped protrusion 136 and the shape of the detents 144 allow for movement and adjustability of the rotatable routing guide 110 in either direction upon the application of rotational force on rotatable routing guide 110.

Figure 12:
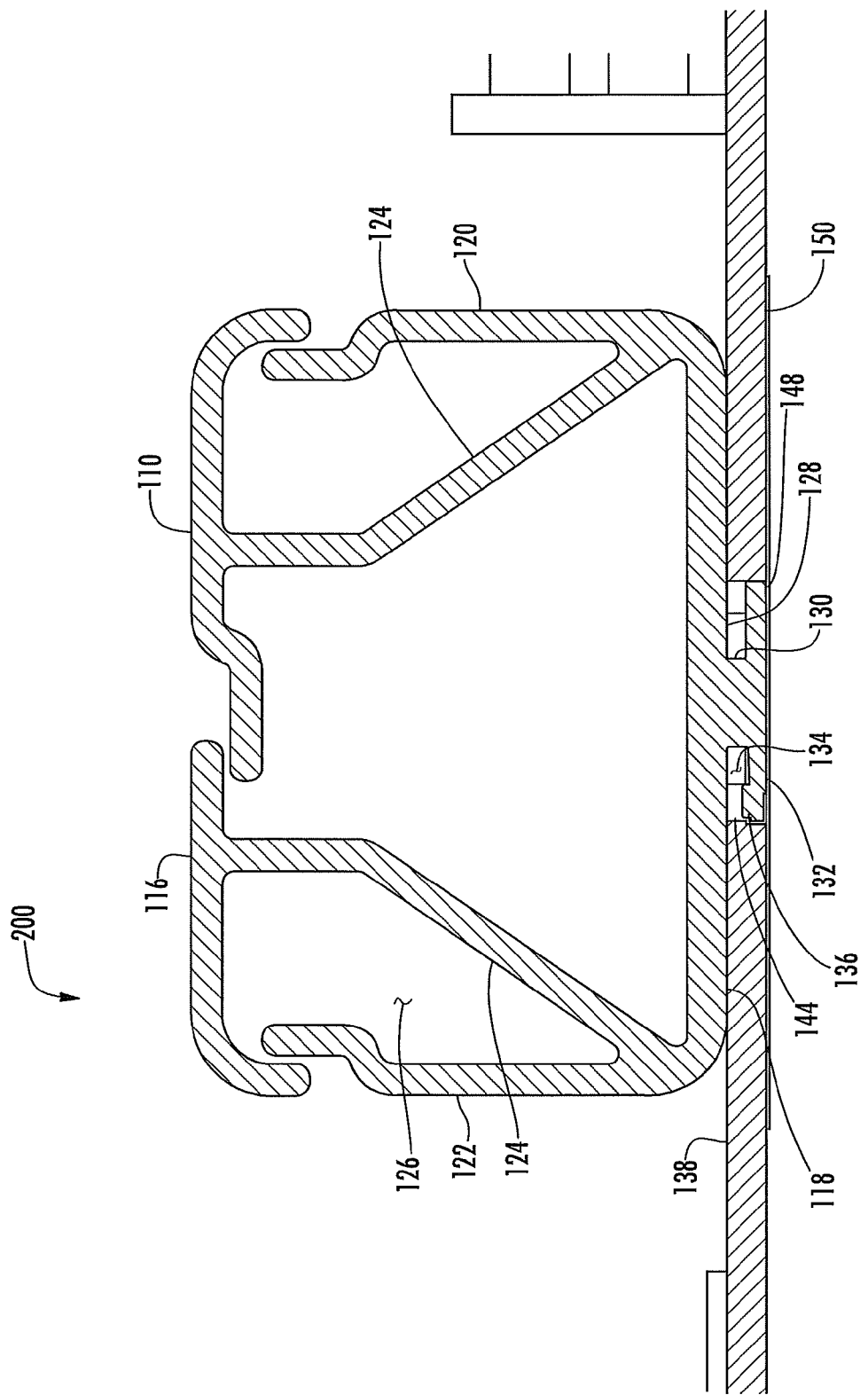
FIG. 12 is a front elevation of the rotatable routing guide assembly with a section cut vertically through the middle of the rotatable routing guide of FIG. 10, the keyed receiver and the mounting surface of FIG. 11.

FIG. 12 illustrates a front elevation of the rotatable routing guide assembly 200 with a section cut vertically through the middle of the rotatable routing guide 110, the keyed receiver 140 and the mounting surface 138. FIG. 12 shows the rotatable routing guide 110 received by the keyed receiver 140 in the mounting surface 138. The rotatable routing guide 110 has been rotated from the insertion position in the slot 142 to a position of one of the detents 144. The keyed receiver 140 has a bottom cut-out 148 extending from the underside 150 of the mounting surface 138. The tab 132 locates in the bottom cut-out 148 and is able to travel within the bottom cut-out 148 as the rotatable routing guide 110 rotates and be flush with or not extending beyond the underside 150 of the mounting surface 138. Additionally, the tab 132 is sloped upwardly biasing the tab 132 against the mounting surface 138 resulting in a constant tension or force between mounting surface 138 and the bottom 118 of the guide portion 112. Also, due to this biasing, when the tab 132 reaches a detent 144 when the rotatable routing guide 110 rotates, the force will cause the tab 132 to insert, position or locate in the detent 144, thereby, releasably locking the rotatable routing guide 110 at that position corresponding to the detent. The application of rotational force to the rotatable routing guide 110 will cause the tab 132 to exit the detent 144 allowing the rotatable routing guide 110 to be rotated to another position.

Figure 13:
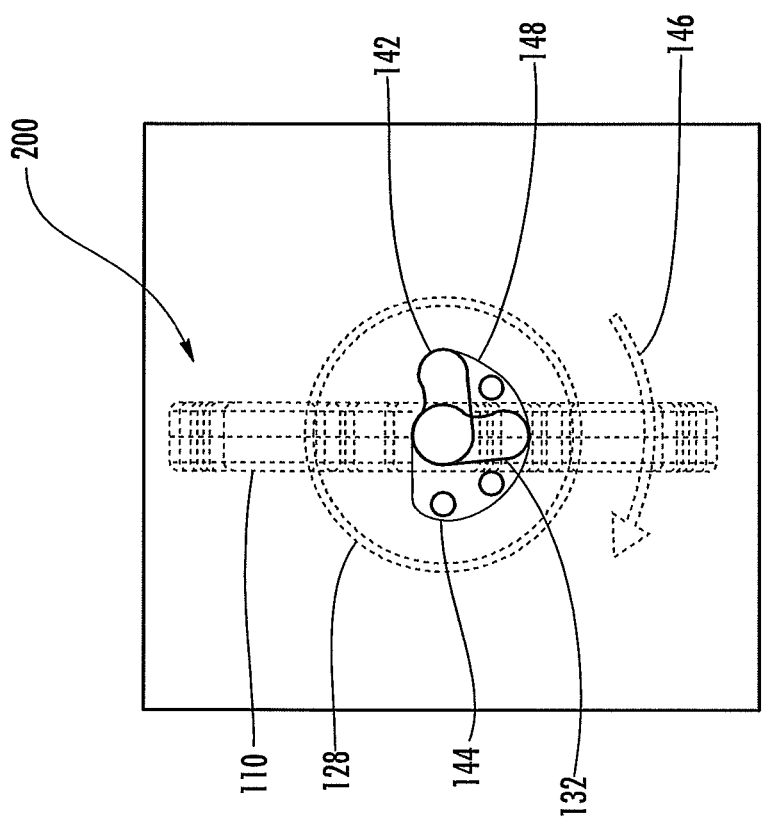
FIG. 13 is a view of the underside of the mounting surface of FIG. 11 showing the rotatable routing guide of FIG. 10 installed on the mounting surface.

FIG. 13 is a view of the underside 150 of the mounting surface 138 showing the rotatable routing guide assembly 200 installed on the mounting surface 138. The rotatable routing guide 110 and the direction arrow 146 are included in FIG. 13 for clarity purposes but are shown in dotted line as they would not be visible from the underside 150 of the mounting surface 138. The rotatable routing guide 110 has been rotated in the direction of the direction arrow 146 from the insertion position in the slot 142 to a position of one of the detents 144. The tab 132 is inserted or located in the detent 144 releasably locking the rotatable routing guide 110 at that position, as discussed above with respect to FIG. 12. The placement of the detents 144 in the keyed receiver 140 may resemble "paw print" shape. The slot 142 is shaped such that the rotatable routing guide 110 can be inserted in the keyed receiver 140 in only one orientation. The detents 144 are located on the centerline of the path of the protrusion 136 of the rotatable routing guide 110 as it is rotated to provide multiple locking positions as desired. In this manner, the protrusion is movably positionable into different ones of the detents 144. The footprint or shape of the attachment feature 114 and/or the arrangement or pattern of the detents 144 may vary. The attachment feature 114 may be any shape. Additionally, any number of detents 144 may be included to provide for any positioning of the rotatable routing guide 110 through the 360 degree angular displacement. In addition, the features could be reversed—the detent 144 may be on the attachment feature 114 and the tooth protrusion 136 may be on the mounting surface 138.

The rotatable routing guide may be constructed of metal or non-metal material. Additionally, the rotatable routing guide may be any shape, segmented or non-segmented, and presents several advantages over conventional routing guides. Such advantages include, without limitation, the convenient as well as functional manner in which the rotatable routing guide is removably attached to the mounting surface. Neither fasteners nor adhesives are needed to secure the rotatable routing guide to the mounting surface. Also, the rotatable routing guide is easily removable without a tool, if necessary. The rotatable routing guide may insert in the mounting surface only one way so as to eliminate the possibility of inserting it incorrectly. The rotatable routing guide releasably locks into place at various angles which accommodates multiple turns, locations, and volumes of fiber while still maintaining the appropriate bend radius. Further, the segments in the rotatable routing guide allow buffer tubes to be segregated or separated from bare fiber or jacketed cable separated from unjacketed.

Many modifications and other embodiments will come to mind to one skilled in the art having the benefit of the teachings presented in the foregoing descriptions and the associated drawings. Therefore, it is to be understood that the description is not to be limited to the specific embodiments disclosed and that modifications and other embodiments are intended to be included within the scope of the appended claims. It is intended that the description cover the modifications and variations provided they come within the scope of the appended claims and their equivalents. Although specific terms are employed herein, they are used in a generic and descriptive sense only and not for purposes of limitation.

What is claimed is:

1. A rotatable routing guide, comprising:
   a guide portion configured to accept fiber optic cable comprising a top, a bottom, a first wall and a second wall, wherein the first wall and the second wall attach to and extend from the bottom; and
   an attachment feature for removably attaching the guide portion to a mounting surface, wherein the routing guide is rotatable and rotatably, selectably positionable when removably attached to the mounting surface;
   wherein at least one of the first wall and the second wall is deformable and defines a gap between the top and the at least one of the first wall and the second wall; and
   wherein the at least one of the first wall and the second wall is configured to deform when a force is applied to the bottom such that, when the at least one of the first wall and the second wall deforms, the at least one of the first wall and the second wall comes into contact with the top, thereby closing the gap between the top and the at least one of the first wall and the second wall.

2. The rotatable routing guide of claim 1, wherein the routing guide is rotatably, selectably positionable at a plurality of points through a 360 degree angular displacement.

3. The rotatable routing guide of claim 1, wherein the attachment feature comprises at least one tab, and wherein the at least one tab is configured to be received by the mounting surface.

4. The rotatable routing guide of claim 3, wherein the at least one tab forms a notch between the guide portion and the tab, and wherein the notch is configured to receive a portion of the mounting surface.

5. The rotatable routing guide of claim 4, wherein the tab is resilient such that the portion of the mounting surface received in the notch is friction fit between the guide portion and the tab with the tab biasing the portion of the mounting surface against the guide portion, and wherein the biasing allows for positioning of the rotatable routing guide in selected multiple positions while maintaining the friction fit.

6. The rotatable routing guide of claim 5, wherein a keyed receiver is formed in the mounting surface, wherein the keyed receiver has a lip extending partially around an interior edge of the keyed receiver, and wherein the portion of the mounting surface is the lip, and wherein the lip is received in the notch and friction fit between the tab and the guide portion.

7. The rotatable routing guide of claim 1, wherein the attachment feature comprises a first tab and a second tab, and wherein the first tab and the second tab are configured to be received by the mounting surface.

8. The rotatable routing guide of claim 7, wherein the first tab forms a first notch between the first tab guide portion, and wherein the second tab forms a second notch between the second tab and the guide portion.

9. The rotatable routing guide of claim 8, wherein the mounting surface comprises a keyed receiver for receiving the attachment feature such that the attachment feature is received by the mounting surface in one orientation.

10. The rotatable routing guide of claim 9, wherein the first tab is configured to be received by a first tab slot in the mounting surface and the second tab is configured to be received by a second tab slot in the mounting surface.

11. The rotatable routing guide of claim 8, wherein the first tab is resilient such that a portion of the mounting surface is received in a notch formed between the first tab and the guide portion, and wherein the portion of the mounting surface is friction fit between the guide portion and the first tab with the first tab biasing the portion of the mounting surface against the guide portion, and wherein the biasing allows for the positioning of the rotatable routing guide in selected multiple positions while maintaining the friction fit.

12. The rotatable routing guide of claim 1, wherein the guide portion has a plurality of routing segments.

13. The rotatable routing guide of claim 1, wherein the force is due to the attachment feature applying a bias to the guide portion when the rotatable routing guide is removably attached to the mounting surface.

14. The rotatable routing guide of claim 1, wherein the guide portion has a third wall between the first wall and the second wall, wherein one end of the third wall is attached to and extends from the bottom, and wherein another end of the third wall is attached to and extends from a center portion of the top.

15. The rotatable routing guide of claim 14, wherein the first wall is attached to a first portion of the top, and the second wall is attached to a second portion of the top.

16. The rotatable routing guide of claim 15, wherein the gap between the top and the at least one of the first wall and the second wall comprises a first gap formed between the first portion of the top and the center portion of the top, and a second gap formed between the second portion of the top and the center portion of the top.

17. The rotatable routing guide of claim 16, wherein force due to the attachment feature applying a bias to the guide portion when the rotatable routing guide is removably attached to the mounting surface, deforms the first wall into contact with the top, thereby closing the first gap, and deforms the second wall into contact with the top, thereby closing the second gap.

18. The rotatable routing guide of claim 1, wherein the attachment feature comprises a tab having a protrusion, and wherein the mounting surface comprises a plurality of detents, and wherein when the rotatable routing guide rotates, the protrusion positions in one of the plurality of detents releasably locking the rotatable routing guide at a position corresponding to the detent.

19. A rotatable routing guide assembly, comprising:
a guide portion, wherein the guide portion is configured to receive fiber optic cable comprising a top, a bottom, a first wall and a second wall, wherein the first wall and the second wall attach to and extend from the bottom; and
an attachment feature for removably attaching the guide portion to a mounting surface, comprising at least one tab connected to the guide portion and forming a notch with the guide portion, and
a keyed receiver in the mounting surface, wherein the keyed receiver has a lip extending partially around an interior edge thereof, and wherein the lip is received in the notch and friction fit between the tab and the guide portion, wherein the routing guide is rotatably, selectably positionable when the guide portion is removably attached to the mounting surface;
wherein at least one of the first wall and the second wall is deformable and defines a gap between the top and the at least one of the first wall and the second wall; and
wherein the at least one of the first wall and the second wall is configured to deform when a force is applied to the bottom such that, when the at least one of the first wall and the second wall deforms, the at least one of the first wall and the second wall comes into contact with the top, thereby closing the gap between the top and the at least one of the first wall and the second wall.

20. The rotatable routing guide of claim 19, wherein the keyed receiver is configured to receive the at least one tab in only one orientation.

21. The rotatable routing guide of claim 19, wherein the at least one tab comprises a first tab and a second tab, wherein the first tab forms a first notch with the guide portion, and wherein the second tab forms a second notch with the guide portion.

22. The rotatable routing guide of claim 21, wherein the first tab and the second tab are different sizes.

23. The rotatable routing guide of claim 22, wherein the keyed receiver has a first slot and a second slot, and wherein the first slot is sized to receive the first tab and the second slot is sized to receive the second tab, and wherein the keyed receiver is configured to receive the first tab and the second tab in only one orientation.

24. The rotatable routing guide of claim 19, wherein the mounting surface is a portion of fiber optic equipment.

25. The rotatable routing guide of claim 24, wherein the portion of the fiber optic equipment is a shelf mounted to a chassis in a fiber optic equipment rack.

26. The rotatable routing guide of claim 19, wherein the guide portion has a plurality of segments, and wherein the guide portion is configured to receive fiber optic cables of different sizes by different ones of the plurality of segments.

27. A rotatable routing guide assembly for fiber optic cables, comprising:
a guide portion, wherein the guide portion has a bottom, a top, a first wall, a second wall and a third wall forming a plurality of segments, and wherein the guide portion is configured to receive fiber optic cables of different sizes by different ones of the plurality of segments, and wherein the first wall and the second wall are deformable and each forms a gap between the top and the respective first wall and second wall;
an attachment feature for removably attaching the guide portion to a shelf of fiber optic equipment, comprising a first tab connected to the guide portion and forming a first notch with the guide portion, and a second tab connected to the guide portion forming a second notch with the guide portion, and
a keyed receiver in the shelf, wherein the keyed receiver has a lip extending partially around an interior edge thereof, and wherein the lip is received in at least one of the first notch and the second notch and friction fit between at least one of the first tab and the second tab and the guide portion,
wherein the routing guide is rotatably, selectably positionable at a plurality of points through a 360 degree angular displacement when the guide portion is removably attached to the shelf; and
wherein the at least one of the first wall and the second wall is configured to deform when a force is applied to the bottom such that, when the at least one of the first wall and the second wall deforms, the at least one of the first wall and the second wall comes into contact with the top, thereby closing the gap between the top and the at least one of the first wall and the second wall.

* * * * *